(12) United States Patent
Guo et al.

(10) Patent No.: US 7,872,990 B2
(45) Date of Patent: Jan. 18, 2011

(54) MULTI-LEVEL INTERCONNECTION NETWORK

(75) Inventors: Chuanxiong Guo, Redmond, WA (US); Songwu Lu, Redmond, WA (US); Lei Shi, Redmond, WA (US); Kun Tan, Redmond, WA (US); Haitao Wu, Redmond, WA (US); Yongguang Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 137 days.

(21) Appl. No.: 12/113,114

(22) Filed: Apr. 30, 2008

(65) Prior Publication Data
US 2009/0274063 A1    Nov. 5, 2009

(51) Int. Cl.
*H04L 12/28* (2006.01)
(52) U.S. Cl. .................. 370/254; 370/255; 370/400; 370/401; 370/404; 370/405; 370/406; 709/220; 709/221; 709/222; 709/223; 709/224
(58) Field of Classification Search ............... None
See application file for complete search history.

(56) References Cited

U.S. PATENT DOCUMENTS

| | | | |
|---|---|---|---|
| 5,592,610 A | | 1/1997 | Chittor |
| 5,669,008 A | | 9/1997 | Galles et al. |
| 6,230,252 B1 | * | 5/2001 | Passint et al. ............... 712/12 |
| 6,289,424 B1 | * | 9/2001 | Stevens .................. 711/170 |
| 6,754,207 B1 | | 6/2004 | Hesse |
| 7,054,867 B2 | | 5/2006 | Bosley et al. |
| 7,075,892 B2 | * | 7/2006 | Grover et al. ............... 370/238 |
| 7,113,506 B1 | | 9/2006 | Cao |
| 2005/0074019 A1 | * | 4/2005 | Handforth et al. ........... 370/406 |
| 2005/0076104 A1 | * | 4/2005 | Liskov et al. ............... 709/223 |
| 2005/0209889 A1 | * | 9/2005 | Funahashi ................... 705/3 |
| 2008/0025208 A1 | * | 1/2008 | Chan ...................... 370/217 |
| 2008/0032705 A1 | * | 2/2008 | Patel et al. ................ 455/456.1 |

(Continued)

FOREIGN PATENT DOCUMENTS

WO    WO-9821857    5/1998

OTHER PUBLICATIONS

"Scaling Internet Data Center Infrastructures to Improve Delivery of Web-Based Services" ©2007 WovenSystems Inc., 2 pages. <URL: www.wovensystems.com>.

(Continued)

*Primary Examiner*—Ayaz R Sheikh
*Assistant Examiner*—Peter Chau
(74) *Attorney, Agent, or Firm*—Perkins Coie LLP

(57) ABSTRACT

A method and system for providing a multi-level interconnection network is provided. A multi-level interconnection network comprises basic cells that are aggregated into higher level cells at each level of the network. At the first level, the basic cells are aggregated into first level cells. Each first level cell is an aggregation of a number of basic cells that is one more than the number of devices in a basic cell. The basic cells of a first level cell are fully connected; that is, each basic cell has a first level link or connection to each other basic cell. In a first level cell, each device of a basic cell has a first level link to each other basic cell. The multi-level interconnection network has higher level cells that are aggregations of lower level cells in a similar manner.

14 Claims, 28 Drawing Sheets

U.S. PATENT DOCUMENTS

| | | | |
|---|---|---|---|
| 2009/0037500 A1* | 2/2009 | Kirshenbaum | 707/206 |
| 2009/0089410 A1* | 4/2009 | Vicente | 709/223 |
| 2009/0113172 A1* | 4/2009 | Deneroff et al. | 712/28 |
| 2009/0237111 A1* | 9/2009 | Mayer et al. | 326/38 |
| 2009/0274043 A1 | 11/2009 | Guo et al. | |

OTHER PUBLICATIONS

Ganesan, et al., "Wormhole Routing in De Bruijn Networks and Hyper-DeBruijn Networks". In: Proceedings of the 2003 International Symposium on vol. 3, May 25-28, 2003, 4 pages. <URL: Citeseer.ist.psu.edu/ganesan03wormhole.html> [Last accessed Feb. 13, 2009].

Kumar, et al., "Extended Hypercube: A Hierarchical Interconnection Network of Hypercubes". In: IEEE Transactions on Parallel and Distributed Systems, vol. 3, No. 1, Jan. 1992, pp. 45-57. <URL: http://ieeexplore.ieee.org/Xplore/login.jsp?url=/ie14/71/3359/00113081.pdf?temp=x> [Last accessed on Feb. 13, 2009].

Latifi, et al., "Incomplete Star: An Incrementally Scalable Network Based on the Star Graph". In: IEEE Transactions on Parallel and Distributed Systems, vol. 5, No. 1, Jan. 1994, pp. 97-102. <URL: ieeexplore.ieee.org/ie14/71/6611/00262593.pdf?arnumber=262593 -> [Last accessed on Feb. 13, 2009].

Linder, et al., "An Adaptive and Fault Tolerant Wormhole Routing Strategy for K-ary n-cubes". In: IEEE Transactions on Computers, vol. 40, No. 1, Jan. 1991, pp. 2-12. ISSN 0018-9340, Publisher IEEE Computer Society, Washington, DC, USA,. <URL:http://dx.doi.org/10.1109/12.67315>. [Last accessed Feb. 13, 2009].

Tripathy, C. R., "Star-Cube: A New Fault-tolerant Interconnection Topology for Massively Parallel Systems". Journal, Institution of Engineers India part of Electronics and Telecommunications Engineering Division, vol. 84, Jan. 2004, pp. 83-92. <URL: http://www.ieindia.org/publish/et/0104/jan04et7.pdf>. [Last accessed Feb. 13, 2009].

Wei, Shi. et al., "Hyper-Butterfly Network: A Scalable Optimally Fault Tolerant Architecture". In: Proceedings of 1998 IPPS/SPDP, 5 pages. <URL: http://ipdps.cc.gatech.edu/1998/papers/105.pdf> [Last accessed on Feb. 13, 2009].

* cited by examiner

MULTI-LEVEL INTERCONNECTION NETWORK

BACKGROUND

A typical data center is a collection of servers that run applications that service requests of clients that may be connected to the data center via the Internet. The applications of a data center may provide services for instant messaging, electronic mail, searching, gaming, serving web pages, and so on. A data center may also host internal services such as a distributed file system.

Because of the rapid growth in the number of users of the Internet and in the number of application services provided to those users, the number of servers in large data centers needed to support such rapid growth is growing at a very rapid rate. For example, one search service has more than 450,000 servers in its data centers, with an average of over 15,000 servers per data center. The number of servers in the data centers appears to be doubling every 14 months.

Because the servers of a data center need to communicate with each other, the servers are interconnected via a network architecture. Some of the goals of establishing a network architecture are scalability, fault tolerance, and high network capacity. Scalability refers to the ability of the network to support a large number of servers and allow for incremental expansion of the network. Fault tolerance refers to the ability of the network to continue functioning in the presence of server, communication link, and server rack failures. (A server rack failure may occur when a rack that houses many servers loses power.) High network capacity refers to the communication bandwidth needed to support the applications of the data center.

The network architecture of typical data centers is generally a tree-based architecture. At the lowest level of the tree, servers are in a rack (e.g., 20-80 servers) connected to a rack switch. At the next higher level, server racks are connected using core switches, each of which connects up to a few hundred server racks. A two-level tree architecture thus can support a few thousand servers. To sustain the rapid growth in demand for servers, more high levels are needed that use faster and more expensive switches.

The tree-based architecture does not scale well in terms of supported bandwidth. The core switches, as well as the rack switches, are bandwidth bottlenecks in a tree-based architecture. The aggregate bandwidth of the servers in a rack is typically one or two orders of magnitude larger than the uplink speed of a rack switch. The bandwidth bottleneck is even more severe at higher level core switches. The tree-based architecture is also susceptible to a "single point of failure." A single failure at a rack switch may disconnect the server rack from the network, whereas a single failure at a core switch may result in thousands of servers being unable to communicate to each other. Although the chances of a "single point of failure" impacting a tree-based network can be reduced by using redundant switches, this redundancy does not solve the problem because a failure can still occur and disconnect thousands of servers from the network.

SUMMARY

A method and system for providing a multi-level interconnection network is provided. A multi-level interconnection network comprises basic cells that are aggregated into higher level cells at each level of the network. At the first level, the basic cells are aggregated into first level cells. A basic cell, which may be considered a zero level cell, is a collection of servers that are interconnected to each other such as by a switch. Each first level cell is an aggregation of a number of basic cells that is one more than the number of servers in a basic cell. The basic cells of a first level cell are fully connected; that is, each basic cell has a first level link or connection to each other basic cell. In a first level cell, each server of a basic cell has a first level link to each other basic cell. Since there is one more basic cell in a first level cell than there are servers in a basic cell, each of the servers of each basic cell can have a first level link to a different server in each other basic cell. Thus, each server of a first level cell has one link to its switch and one first level link to another server in another basic cell of the first level cell. A first level cell contains a number of servers that is the number of servers in a basic cell times the number of basic cells in a first level cell.

The multi-level interconnection network may also have second level cells and higher level cells that are aggregations of next lower level cells in a similar manner. Each second level cell is an aggregation of the number of first level cells that is one more than the number of servers in a first level cell. Since there is one more first level cell in a second level cell than there are servers in a first level cell, each of the servers in each first level cell can have a second level link to one server in each other first level cell. Thus, a server of a second level cell has one link to its switch in the basic cell, one first level link to another basic cell of that first level cell, and one second level link to another server in another first level cell of the second level cell. A second level cell contains a number of servers that is the number of servers in a first level cell times the number of first level cells in a second level cell. In a similar manner, a third level cell is an aggregation of a number of second cells that is one more than the number of servers in a second level cell.

A multi-level interconnection network can use various routing techniques to route messages between source servers and destination servers that can take advantage of the multi-level link structure of the network. An initial routing algorithm, referred to as the routing algorithm or routing component, generates a path for routing a packet from a source server to a destination server assuming that all links are available. The routing algorithm initially identifies the closest common ancestor cell that contains both the source server and the destination server. If the closest common ancestor cell is a basic cell, that is, both servers are within the same basic cell, then the routing algorithm establishes a path as an intra-basic cell path from the source server to the destination server through the switch of the basic cell. Otherwise, the routing algorithm identifies the inter-cell link that connects the child cell of the closest common ancestor cell that contains the source server to the child cell of the closest common ancestor cell that contains the destination server. The server on the source side of the identified inter-cell link is referred to as the source-side server, and the server on the server side of the identified inter-cell link is referred to as the destination-side server. The routing algorithm then generates a source-side path from the source server to the source-side server and a destination-side path from the source-side server to the destination server.

A multi-level interconnection network can be incrementally deployed in a way that helps ensure a high level of connectivity without the need to reconfigure portions of the network that are already deployed. A deployment technique establishes a minimum cell with a minimum cell level that represents the minimum unit of addition to the network. A top-down technique for incrementally adding minimum cells to the network assigns the first minimum cell to the first child cell of the highest level and to the first cells within the lower levels of the first child cell of the highest level. The top-down technique then assigns the second minimum cell to the second child cell of the highest level and to the first cells within the lower levels of that second child cell. The top-down technique continues adding one minimum cell to each child cell within the highest level (referred to as a second highest level cell) until the number of second highest level cells that contain a minimum cell is one more than the number of servers in a minimum cell. As each minimum cell is added, the top-down technique links each minimum cell via a highest level link to each other minimum cell in a second highest level cell. The top-down technique then recursively adds one minimum cell to the child cells of the first second level cell until one more than the number of child cells has one minimum cell. When the second level above the minimum cell has one minimum cell in a number of child cells that is one more than the number of servers in the minimum cell, subsequent minimum cells are added to fill those minimum cells that already have one cell. When all those cells are filled, subsequent minimum cells are added to fill other cells.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
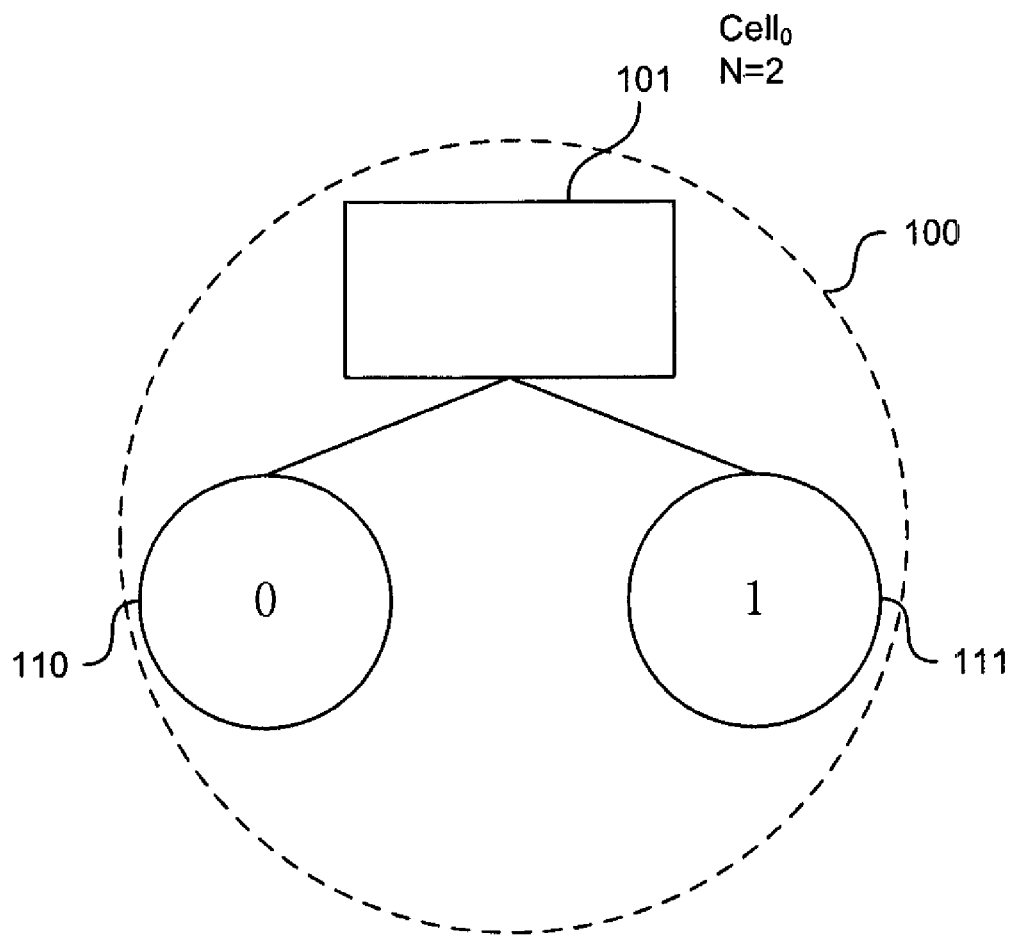
FIG. 1 illustrates a basic cell that contains two servers.

A method and system for providing a multi-level interconnection network for a data center is provided. In some embodiments, a multi-level interconnection network comprises basic cells that are aggregated into higher level cells at each level of the network. For example, a basic cell may include a number of servers (e.g., 5) that are each directly linked or connected to a switch. At the first level, the basic cells are aggregated into first level cells. Each first level cell is an aggregation of a number of basic cells that is one more than the number of servers in a basic cell. For example, if the number of servers in a basic cell is 5, then the number of basic cells in a first level cell is 6. The basic cells of a first level cell are fully connected; that is, each basic cell has a first level link or connection to each other basic cell. In a first level cell, each server of a basic cell has a first level link to each other basic cell. Since there is one more basic cell in a first level cell than there are servers in a basic cell, each of the servers of each basic cell can have a first level link to a different server in each other basic cell. Thus, each server of a first level cell has one link to its switch and one first level link to another server in another basic cell of the first level cell. A first level cell contains a number of servers that is the number of servers in a basic cell times the number of basic cells in a first level cell. For example, if the number of servers in a basic cell is 5, then the number of basic cells in a first level cell is 6 and the number of servers in a first level cell is 30 (i.e., 5×6).

The multi-level interconnection network may also have second level cells and higher level cells that are aggregations of next lower level cells in a similar manner. Each second level cell is an aggregation of the number of first level cells that is one more than the number of servers in a first level cell. For example, if the number of servers in a first level cell is 30, then the number of first level cells in a second level cell is 31. Since there is one more first level cell in a second level cell than there are servers in a first level cell, each of the servers in each first level cell can have a second level link to one server in each other first level cell. Thus, a server of a second level cell has one link to its switch in the basic cell, one first level link to another basic cell of that first level cell, and one second level link to another server in another first level cell of the second level cell. A second level cell contains a number of servers that is the number of servers in a first level cell times the number of first level cells in a second level cell. For example, if the number of servers in a first level cell is 30, then the number of first level cells in the second level cell is 31 and the number of servers in a second-level cell is 930 (30×31). In a similar manner, a third level cell is an aggregation of a number of second cells that is one more than the number of servers in a second level cell. Thus, if the number of servers in a second level cell is 930, then the number of second level cells in the third level cell is 931 and the number of servers in a third level cell is 865,830 (930×931). One skilled in the art will appreciate that a multi-level interconnection network can be used to interconnect types of devices other than servers, such as switches, routers and mobile phones of users or personal computing devices of users. One skilled in the art will also appreciate that the devices of a basic cell can be connected using connection mechanisms other than a switch. For example, each device of a basic cell can be directly connected to each other device of that basic cell, connected in a ring structure, connected through a communication bus, and so on.

In some embodiments, a multi-level interconnection network can use various routing techniques to route messages between source servers and destination servers that can take advantage of the multi-level link structure of the network. An initial routing algorithm, referred to as the routing algorithm or routing component, generates a path for routing a packet from a source server to a destination server assuming that all links are available (e.g., no link or server has failed). The routing algorithm initially identifies the closest common ancestor cell that contains both the source server and the destination server. For example, in a three level network, if the source server and the destination server are in different first level cells of the same second level cell, then the closest common ancestor cell is that second level cell. If the closest common ancestor cell is a basic cell, that is, both servers are within the same basic cell, then the routing algorithm establishes a path as an intra-basic cell path from the source server to the destination server through the switch of the basic cell. Otherwise, the routing algorithm identifies the inter-cell link that connects the child cell of the closest common ancestor cell that contains the source server to the child cell of the closest common ancestor cell that contains the destination server. The server on the source side of the identified inter-cell link is referred to as the source-side server, and the server on the server side of the identified inter-cell link is referred to as the destination-side server. The routing algorithm then generates a source-side path from the source server to the source-side server and a destination-side path from the source-side server to the destination server. The routing algorithm may be recursively invoked to identify the source-side path and the destination-side path. The routing algorithm establishes the path from the source server to the destination server as the concatenation of the source-side path, the identified inter-cell link, and the destination-side path.

In some embodiments, a multi-level interconnection network uses a fault-tolerant routing technique algorithm, referred to as a failure routing algorithm, to establish a path that avoids servers and links that have failed. The failure routing algorithm may establish an initial path from a source server to a destination server using the routing algorithm described above. When it is determined that a failure has occurred along the initial path, the failure routing algorithm identifies the level of the failed link with a source-side server being on the source side of the failed link and a destination-side server being on the destination side of the failed link. The source-side server and the destination-side server are in different child cells of the level of the failed link. For example, if the failed link is a second level link, then the source-side server and the destination-side server are in two different first level cells of the same second level cell. The failure routing algorithm then selects a source-side proxy server in a sibling cell at the same level as the child cells that contain the source-side server and the destination-side server. The failure routing algorithm establishes a to-proxy path from the source-side server to the source-side proxy server and a from-proxy path from the source-side proxy server to the destination server. The failure routing algorithm establishes the modified path to avoid the failure as a concatenation of a portion of the initial path from the source server to the source-side server, the to-proxy path, and the from-proxy path. Variations of the failure routing algorithm that factor in other failure conditions are described below.

In some embodiments, a multi-level interconnection network can be incrementally deployed in a way that helps ensure a high level of connectivity without the need to reconfigure portions of the network that are already deployed. A deployment technique establishes a minimum cell with a minimum cell level that represents the minimum unit of addition to the network. The minimum cell has a minimum number of servers. For example, a minimum cell may be a basic cell or a first level cell. (A basic cell may be considered to be a zero level cell.) The deployment technique also establishes the highest level for the multi-level interconnection network. Thus, once the number of servers in a basic cell is established and the highest level is established, the maximum number of servers for that network is established. A top-down technique for incrementally adding minimum cells to the network operates as follows. Each child cell of a parent cell may be assigned a unique index within its parent cell including servers within a basic cell. Each server can thus be uniquely identified by the sequence of indexes from that within the basic cell to that within the highest level cell. The top-down technique assigns the first minimum cell to the cells with the first index from the highest level to the level that contains the minimum cells. The top-down technique then assigns the second minimum cell to the child cell with the second index in the highest level and to cells with the first index for cells in the lower levels. The top-down technique continues adding one minimum cell to each child cell within the highest level (referred to as a second highest level cell) until the number of second highest level cells that contain a minimum cell is one more than the number of servers in a minimum cell. As each minimum cell is added, the top-down technique links each minimum cell via a highest level link to each other minimum cell in second highest level cells. As a result, when the number of second highest level cells with one minimum cell is one more than the number of servers in a minimum cell, the second highest level cells can be fully connected via highest level links.

After enough second highest level cells have minimum cells to be fully connected, the top-down technique assigns subsequent minimum cells to the second highest level cell that has the first index until that second highest level cell is full. The top-down technique then continues to fill each second highest level cell in index order. To fill a second highest level cell after one minimum cell has been assigned to it, the top-down technique assigns the next minimum cell to the third level cell with the second index within that second level cell and to the first index for cells at all lower levels. (The top-down technique already assigned a minimum cell to the first index of that third level cell.) The top-down technique then continues by assigning subsequent minimum cells to the second level cell with the second index and to its third level cells until the number of third level cells that have been assigned one minimum cell is one more than the number of servers in the minimum cell. As each minimum cell is assigned, it is fully connected to other minimum cells via third level links resulting in the third level cells being fully connected. The top-down technique then assigns subsequent minimum cells to the third level cell with the first index until it is full and then assigns further subsequent minimum cells to each other third level cell of the second level cell with the first index until all are fully connected. The top-down technique then repeats the process for the second level cell with the second and subsequent indexes.

FIGS. 1-12 illustrate various aspects of a multi-level interconnection network in some embodiments. FIG. 1 illustrates a basic cell that contains two servers. The basic cell 100 includes a switch 101 and servers 110 and 111. Each server is directly connected to the switch. Each server is provided with a unique index within the basic cell. In this example, server 110 is assigned the index of 0, and server 111 is assigned the index of 1.

Figure 2:
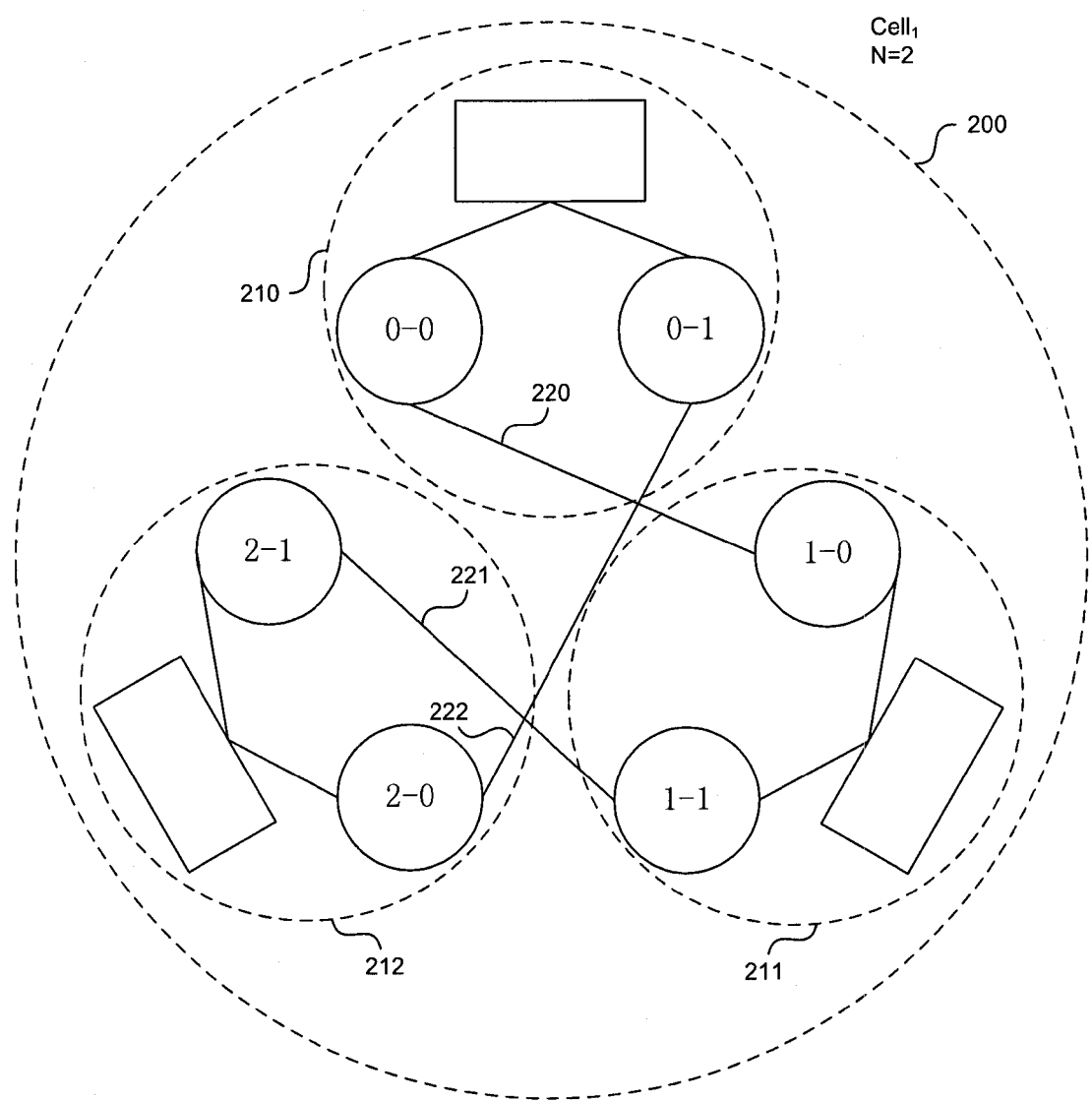
FIG. 2 illustrates a first level cell created from the basic cell illustrated in FIG. 1.

FIG. 2 illustrates a first level cell created from the basic cell illustrated in FIG. 1. The first level cell 200 includes three basic cells 210, 211, and 212. Each basic cell is connected to each other basic cell via a first level link. First level link 220 connects basic cells 210 and 211, first level link 221 connects basic cells 211 and 212, and first level link 222 connects basic cells 212 and 210. Each first level link connects a pair of servers of a basic cell such that each server of a basic cell has only one first level link. Each basic cell within a first level cell is assigned a unique index within the first level cell. In this example, basic cell 210 is assigned the index of 0, basic cell 211 is assigned the index of 1, and basic cell 212 is assigned the index of 2. Each server within the first level cell can be uniquely identified by an identifier that is a combination of the index of its basic cell within the first level cell and the index of the server within its basic cell. For example, the servers of basic cell 210 are uniquely identified by the sequence of 0-1 and 0-0, the servers of basic cell 211 are uniquely identified by the sequence 1-1 and 1-0, and the servers of basic cell 212 are uniquely identified by the sequence 2-1 and 2-0.

Figure 3:
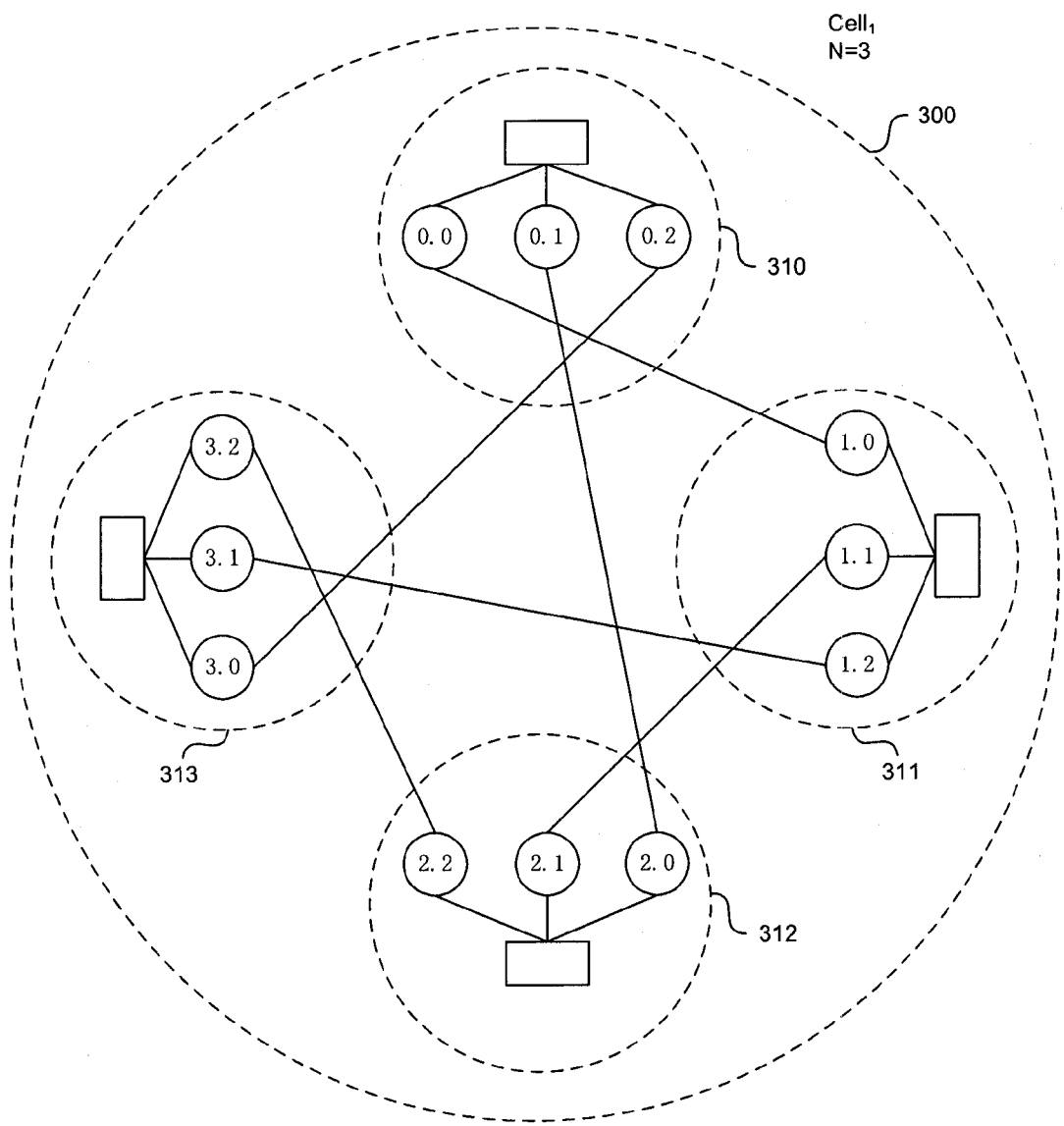
FIG. 3 illustrates a first level cell created from basic cells with three servers.

FIG. 3 illustrates a first level cell created from basic cells with three servers. A first level cell 300 includes basic cells 310, 311, 312, and 313. Since a first level cell contains one more basic cell than the number of servers in the basic cell, first level cell 300 includes four basic cells. Each basic cell is connected to each other basic cell through one of its servers via a first level link so that each basic cell has one first level link to each other basic cell of first level cell 300 and are thus fully connected.

Figure 4:
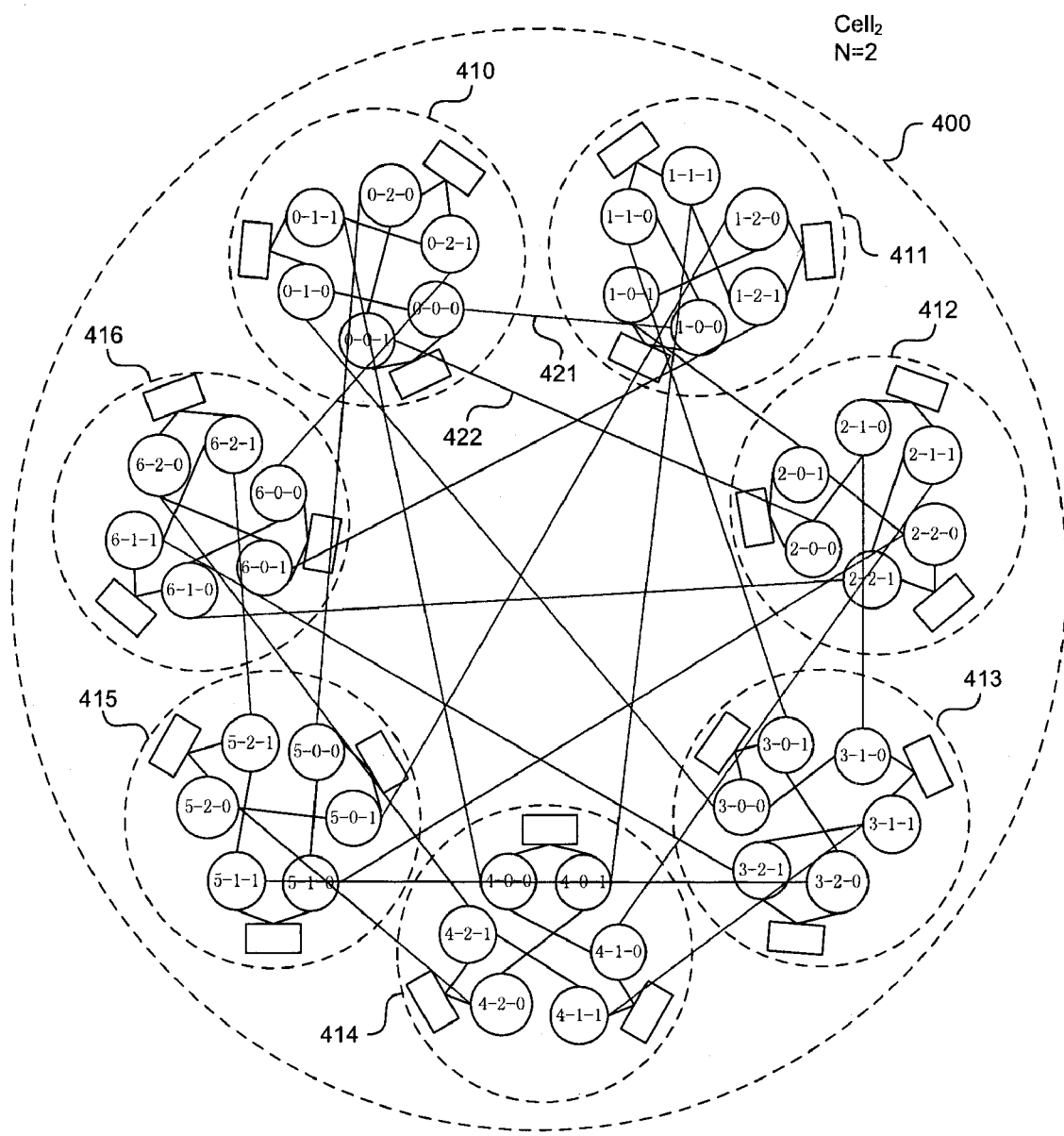
FIG. 4 illustrates a second level cell created from first level cells as illustrated in FIG. 2.

FIG. 4 illustrates a second level cell created from the first level cells as illustrated in FIG. 2. A second level cell 400 includes first level cells 410-416. Since a second level cell contains one more first level cell than the number of servers in the first level cell, the second level cell contains 7 (e.g., 6+1) first level cells. Each first level cell is connected to each other first level cell through one of its servers via a second level link. For example, first level cell 410 is connected to the first level cell 411 via second level link 421, and first level cell 410 is connected to first level cell 412 via second level link 422.

Figure 5:
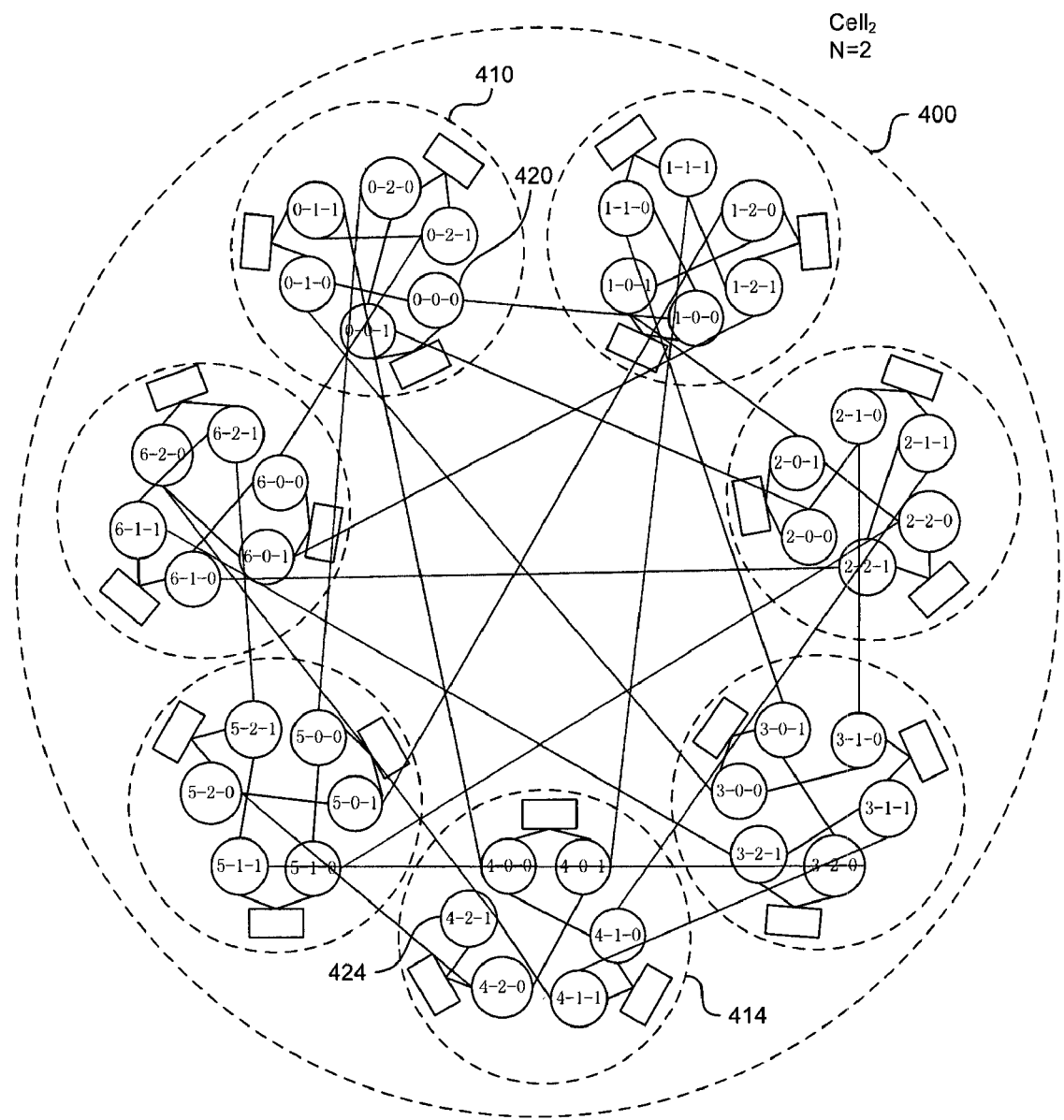
FIG. 5 illustrates a source server and a destination server of the second level cell illustrated in FIG. 3.

FIGS. 5-9 illustrate generating a path from a source server to a destination server using the routing algorithm in some embodiments. FIG. 5 illustrates a source server and a destination server of the second level cell 400 illustrated in FIG. 3. First level cell 410 contains the source server 420, and first level cell 414 contains the destination server 424. The routing algorithm initially identifies the closest common ancestor cell that contains both the source server and the destination server. In this example, since the source server and the destination server are in different first level cells, the closest common ancestor cell is second level cell 400.

Figure 6:
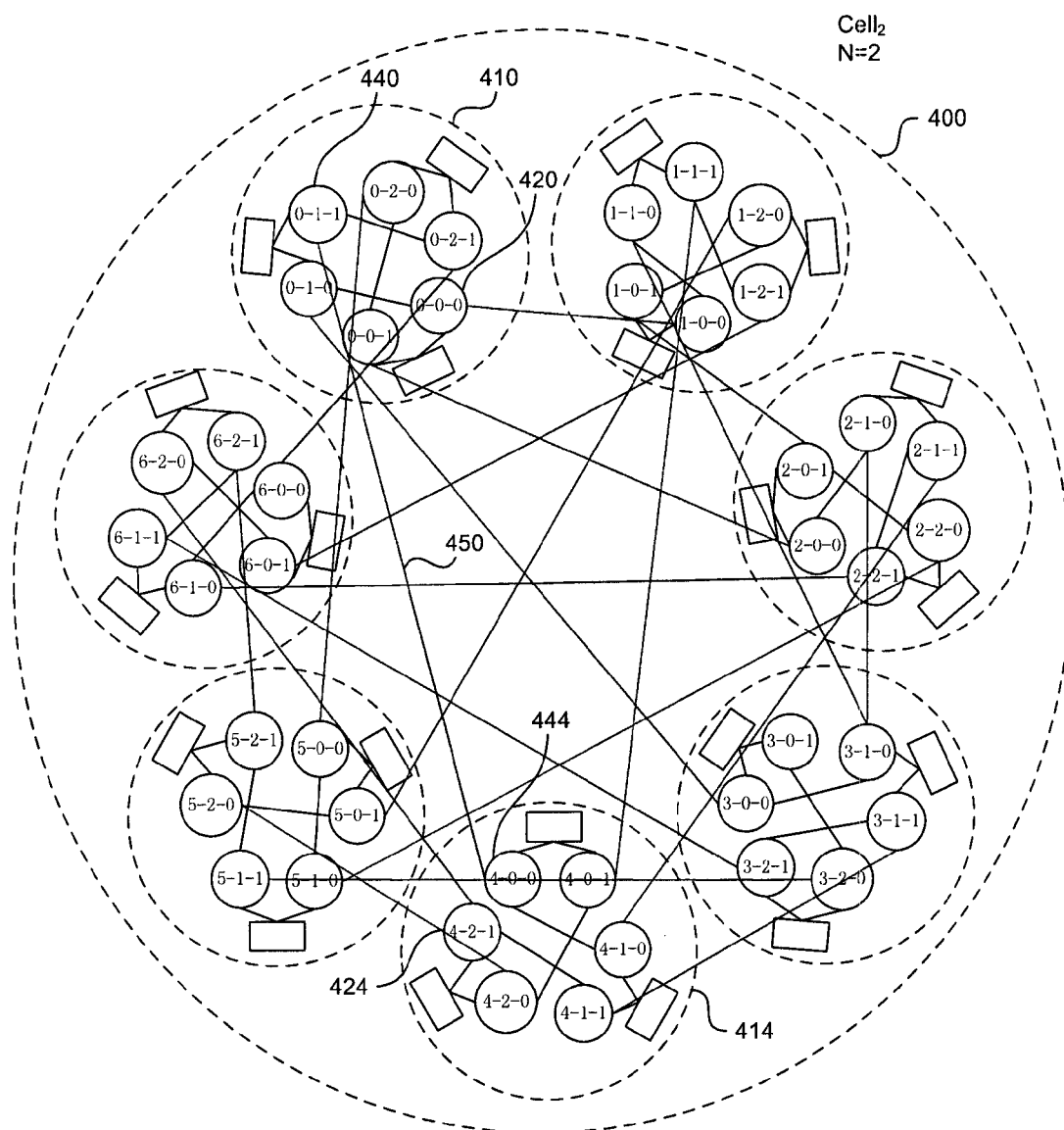
FIG. 6 illustrates an inter-cell link between the first level cells that contain the source server and the destination server.

FIG. 6 illustrates an inter-cell link between the first level cells that contain the source server and the destination server. First level cell 410 and first level cell 414 are connected via a second level link 450. The source-side server of second level link 450 is server 440, and the destination-side server of second level link 450 is server 444. Thus, the second level link 450 is in the path. The source-side path connects the source server 420 to the source-side server 440, and the destination-side path connects the destination-side server 444 to the destination server 424. The routing algorithm establishes the path as the concatenation of the source-side path, second level link 450, and the destination-side path.

Figure 7:
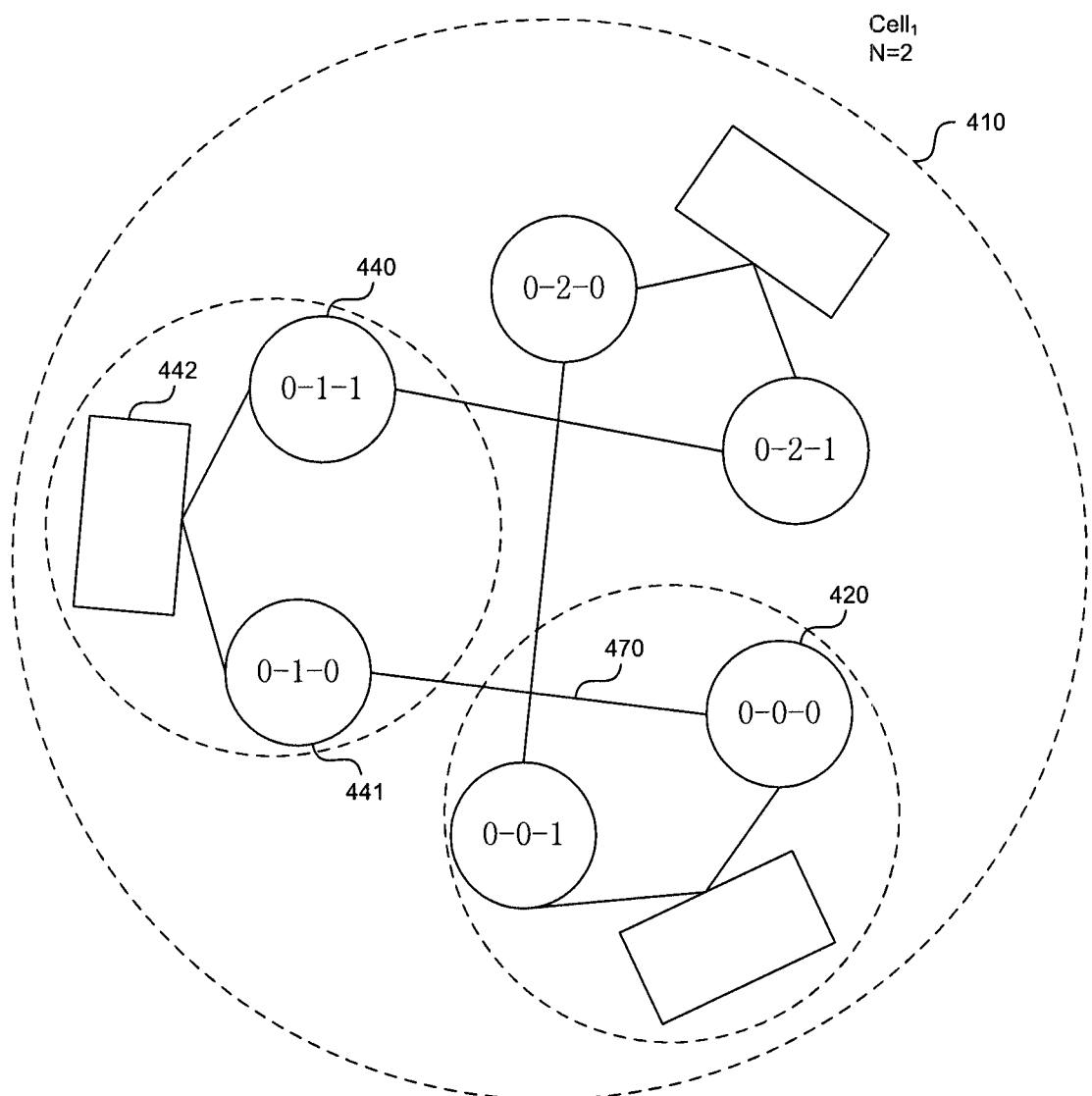
FIG. 7 illustrates a source-side path in some embodiments.

FIG. 7 illustrates a source-side path in some embodiments. First level cell 410 includes source server 420 and source-side server 440. To establish the source-side path, the routing algorithm considers source-side server 440 as a destination server of the source-side path. The routing algorithm identifies the closest common ancestor cell that contains both the source server and the destination server. In this example, the closest common ancestor cell is first level cell 410. The routing algorithm then identifies a link 470 between the basic cells that contain the source server 420 and the destination server of source-side server 440. Since link 470 does not connect to the destination server 440 of the source-side path, the routing algorithm establishes a path from a destination-side server 441 of link 470 to destination server 440 through switch 442. Thus, the source-side path includes link 470 and the link through switch 442.

Figure 8:
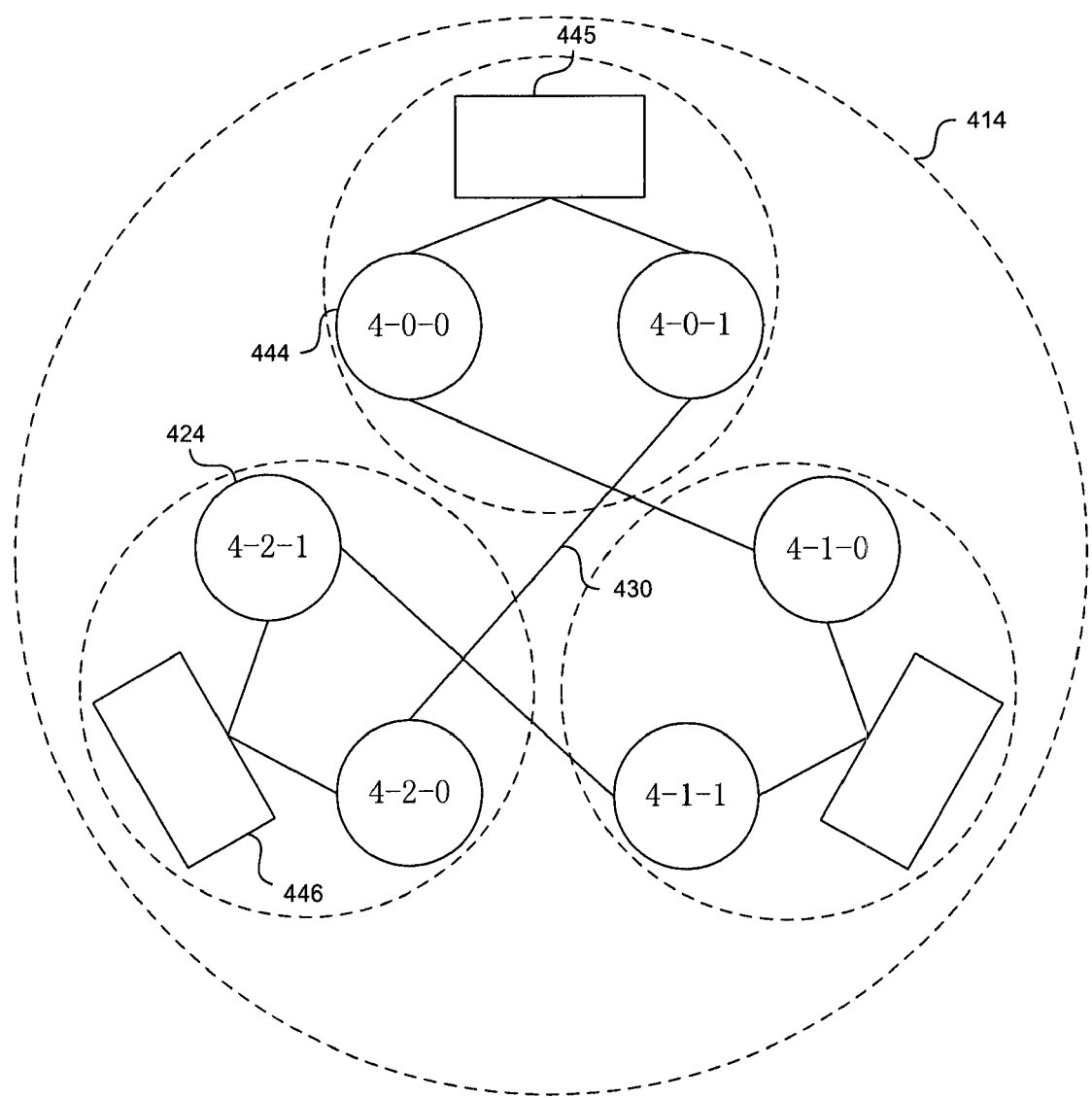
FIG. 8 illustrates a destination-side path in some embodiments.

FIG. 8 illustrates a destination-side path in some embodiments. The destination-side path within first level cell 414 from the destination-side server 444 to the destination server 424 includes the link through switch 445, link 430, and the link through switch 446.

Figure 9:
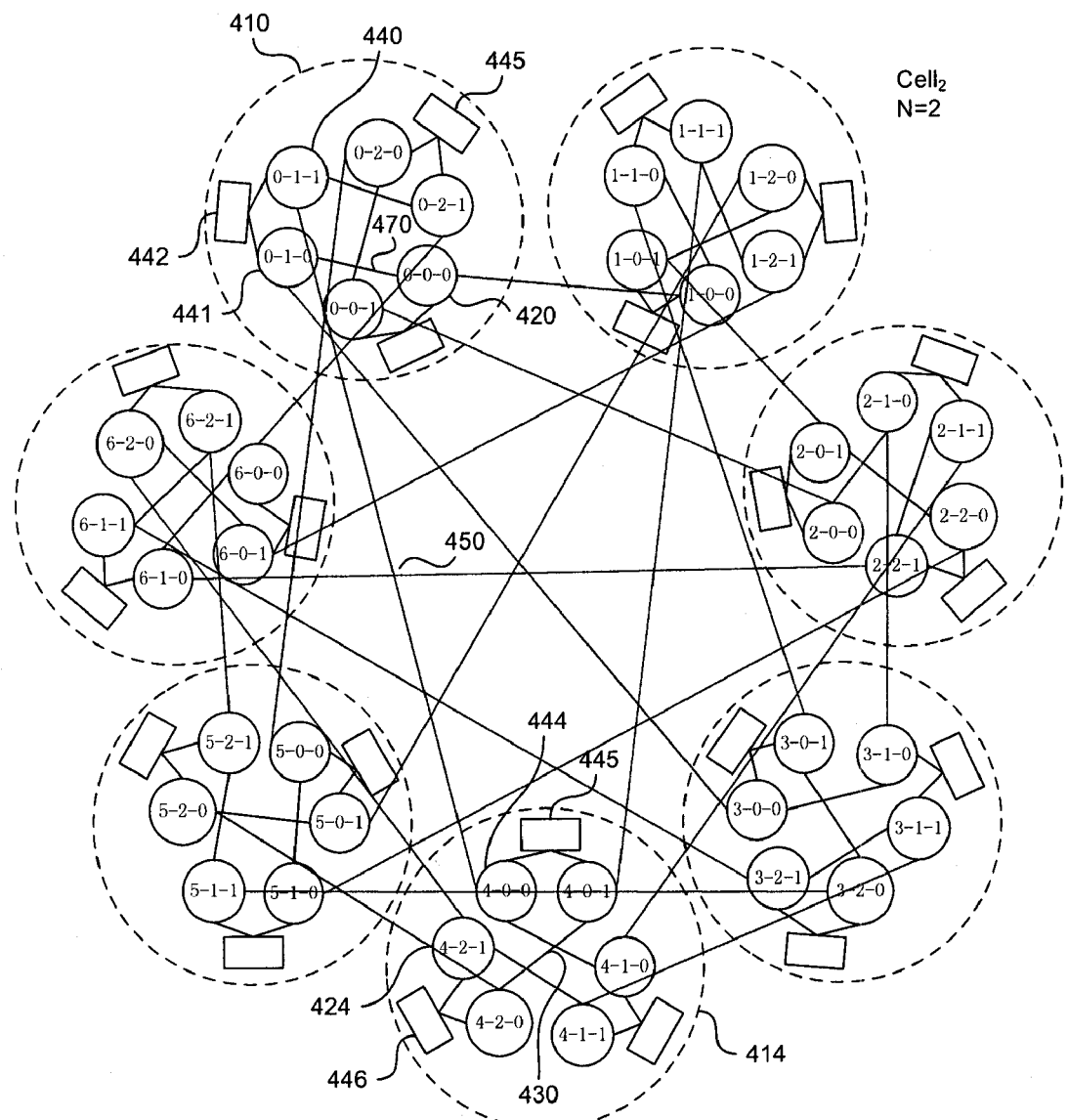
FIG. 9 illustrates the complete path between a source server and a destination server in some embodiments.

FIG. 9 illustrates the complete path between a source server and a destination server in some embodiments. The complete path from the source server 420 to the destination server 424 includes link 470, the link through switch 442, link 450, the link through switch 445, link 430, and the link through 446.

Figure 10:
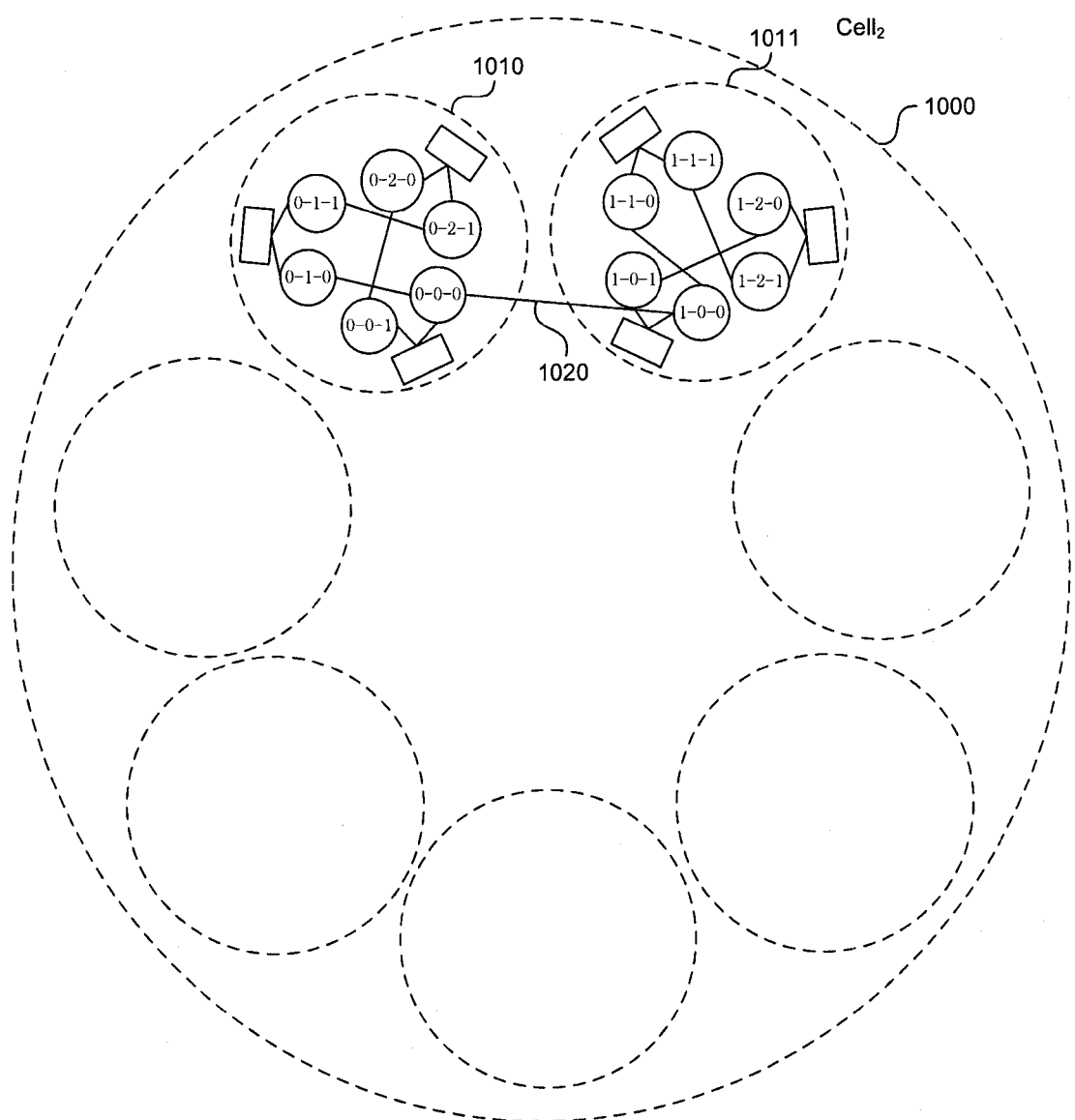
FIG. 10 illustrates an incremental deployment of a second level interconnection network using a bottom-up technique in some embodiments.

FIG. 10 illustrates an incremental deployment of a second level interconnection network using a bottom-up technique in some embodiments. In this example, the minimum cell, which is the unit of deployment, is a basic cell with two servers. First level cell 1010 of second level cell 1000 is filled first with basic cells. After the first level cell 1010 is full, the bottom-up technique starts adding basic cells to first level cell 1011 until it is full and then continues to fill each other first level cell until each is full before starting to fill the next first level cell. After first level cell 1010 and first level cell 1011 are full as illustrated by FIG. 10, they are connected only via second level link 1020. The bottom-up technique suffers from the problem that second level link 1020 represents a "single point of failure" that would divide the network deployed so far into two equal sized sub-networks: first level cell 1010 and first level cell 1011.

Figure 11:
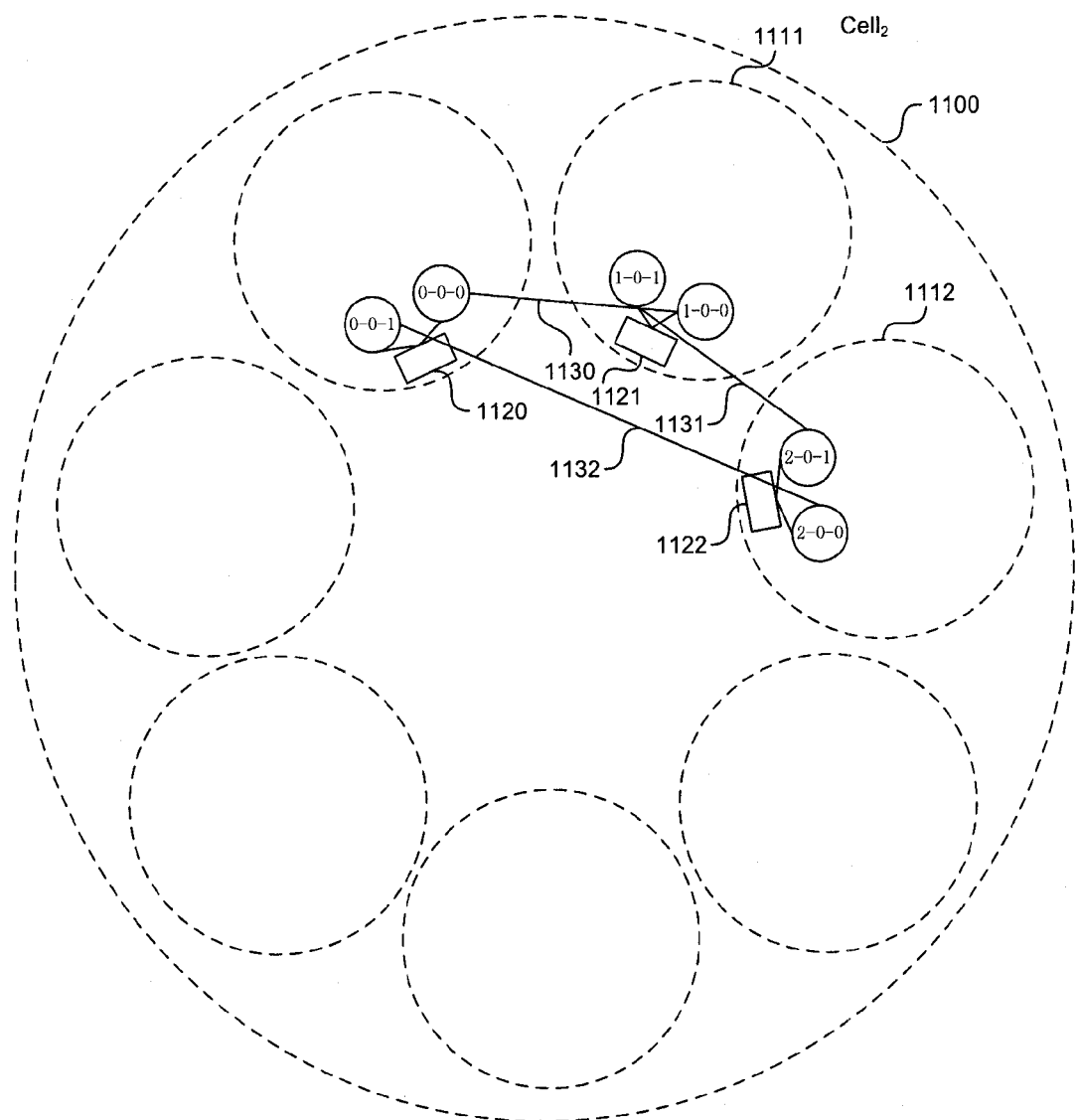
FIG. 11 illustrates an incremental deployment of a second level interconnection network using a top-down technique in some embodiments.

FIG. 11 illustrates an incremental deployment of a second level interconnection network using a top-down technique in some embodiments. In this example, the minimum cell is a basic cell with two servers. The first basic cell 1120 is added to first level cell 1110, the second basic cell 1121 is added to first level cell 1111, and the third basic cell 1122 is added to first level cell 1112 forming second level cell 1100. The basic cells that have been added so far allow first level cells 1110, 1111, and 1112 to be fully connected through links 1130, 1131, and 1132. This deployment technique has no "single point of failure" between first level cells 1110, 1111, and 1112 after three basic cells are added.

Figure 12:
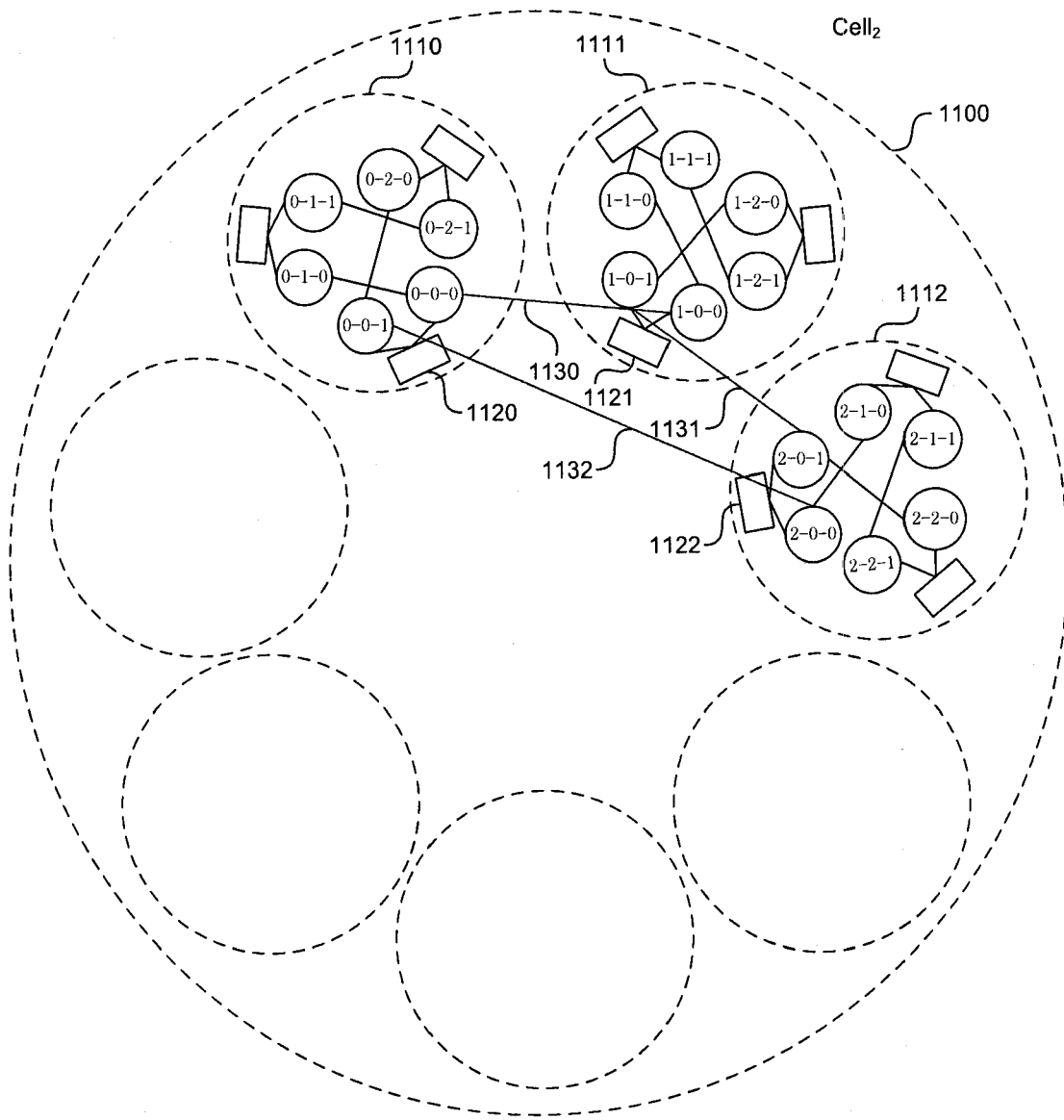
FIG. 12 illustrates the continued incremental deployment of a second level interconnection network using a top-down deployment technique in some embodiments.

FIG. 12 illustrates the continued incremental deployment of a second level interconnection network using a top-down deployment technique in some embodiments. The 4th through 9th basic cells that are added to second level cell 1100 are added to first level cells 1110, 1111, and 1112 to fill those cells.

Figure 13:
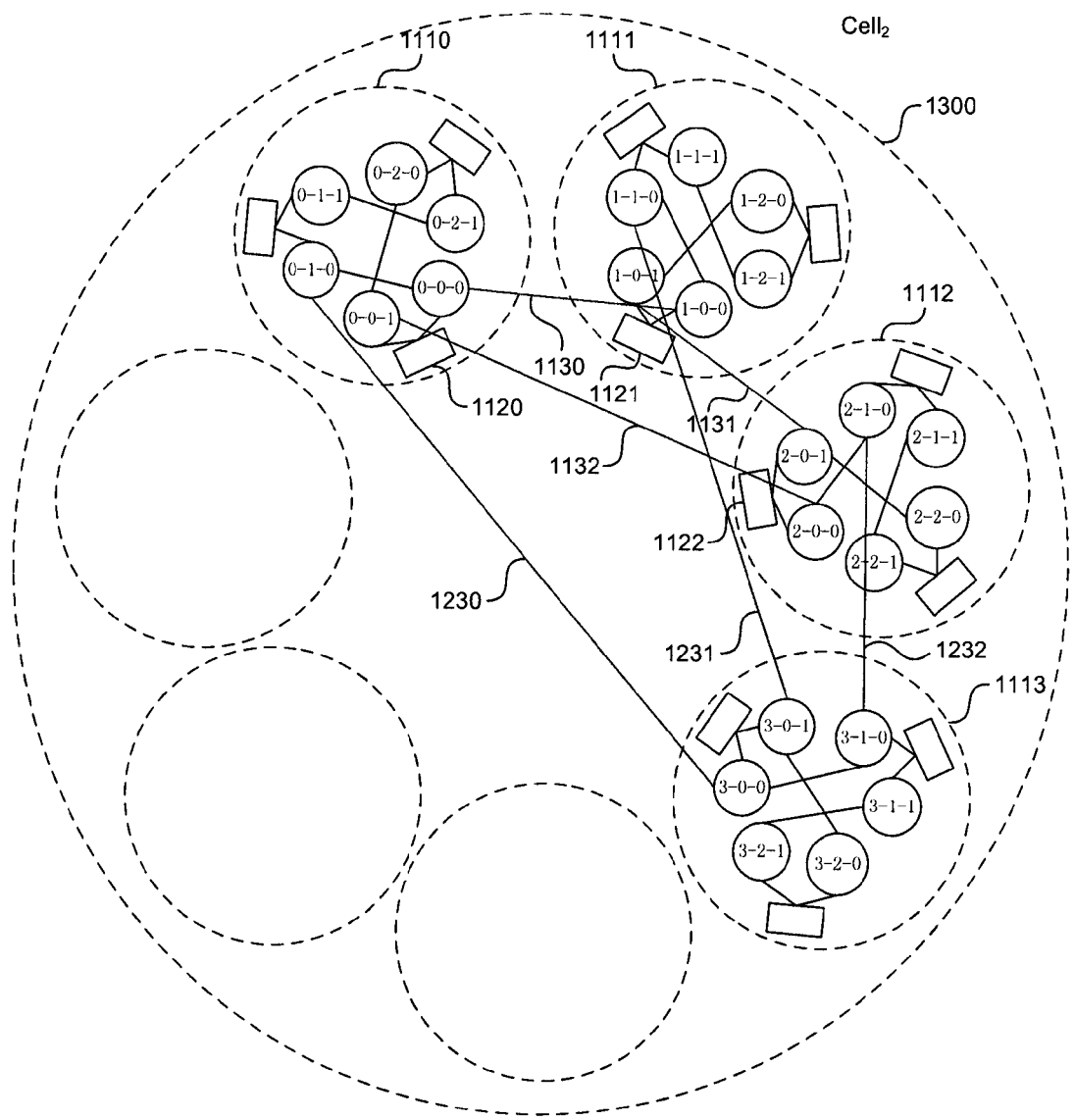
FIG. 13 illustrates further continued incremental deployment of a second level interconnection network using a top-down technique in some embodiments.

FIG. 13 illustrates further continued incremental deployment of a second level interconnection network using a top-down technique in some embodiments. The 10th through 12th basic cells are added to first level cell 1113. First level cell 1113 has a second level link 1230, 1231, and 1232 to each of first level cells 1110, 1111, and 1112.

Figure 14:
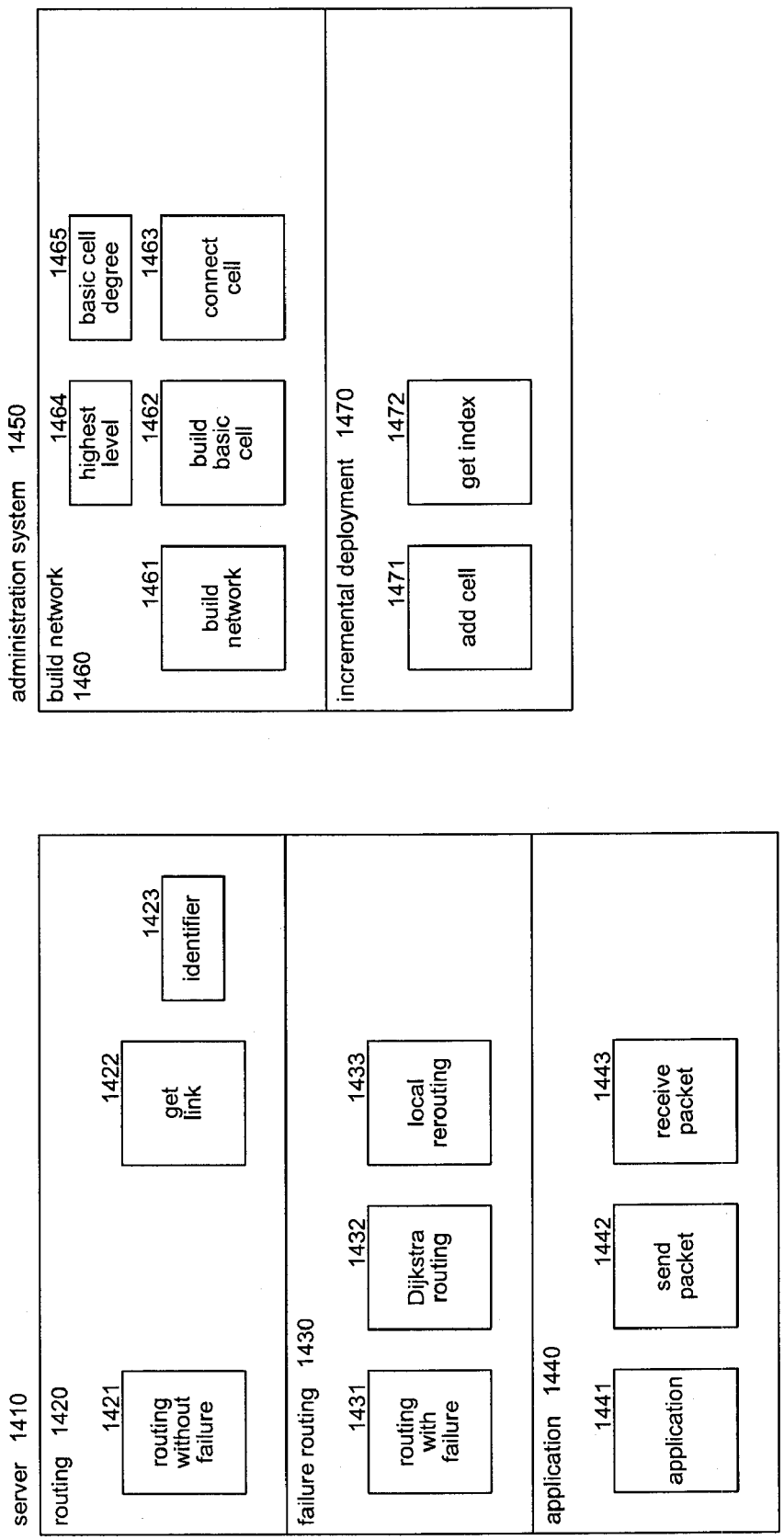
FIG. 14 is a block diagram that illustrates components of a server and an administrative system of a multi-level interconnection network in some embodiments.

FIG. 14 is a block diagram that illustrates components of a server and an administrative system of a multi-level interconnection network in some embodiments. The server 1410 includes a routing subsystem 1420, a failure routing subsystem 1430, and an application subsystem 1440. The routing subsystem provides a routing component 1421, a get link component 1422, and an identifier store 1423. The identifier store contains the unique identifier assigned to this server. The failure routing subsystem includes a failure routing component 1431, a Dijkstra routing component 1432, and a local rerouting component 1433. The application subsystem 1440 includes an application component 1441, a send packet component 1442, and a receive packet component 1443. The application component provides the services for the server and invokes the send packet component to send packets of information to other servers and the receive packet component to receive packets of information from other servers.

The administration system 1450 includes a build network subsystem 1460 and an incremental deployment subsystem 1470. The build network subsystem includes a build network component 1461, a build basic cell component 1462, a connect cell component 1463, a highest level store 1464, and a basic cell server number store 1465. (The server number of cell is the maximum number of servers of the cell.) The build network component is used to build a complete multi-level interconnection network. The highest level store indicates the highest level of the network, and the basic cell server number store indicates the number of servers in the basic cell. The incremental deployment subsystem includes an add cell component 1471 and a get index component 1472. The incremental employment subsystem may be used to assign identifiers to minimum cells when a network is incrementally deployed.

The servers of the multi-level interconnection network may include a central processing unit, memory, input devices, output devices, storage devices, and communication ports. The memory and storage devices are computer-readable storage media that may be encoded with computer-executable instructions that implement the components of devices or an administration system, which means a computer-readable storage medium that contains the instructions. In addition, the instructions, data structures, and message structures may be transmitted via a data transmission medium, such as a signal on a communication link.

The components of the multi-level interconnection network may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 15:
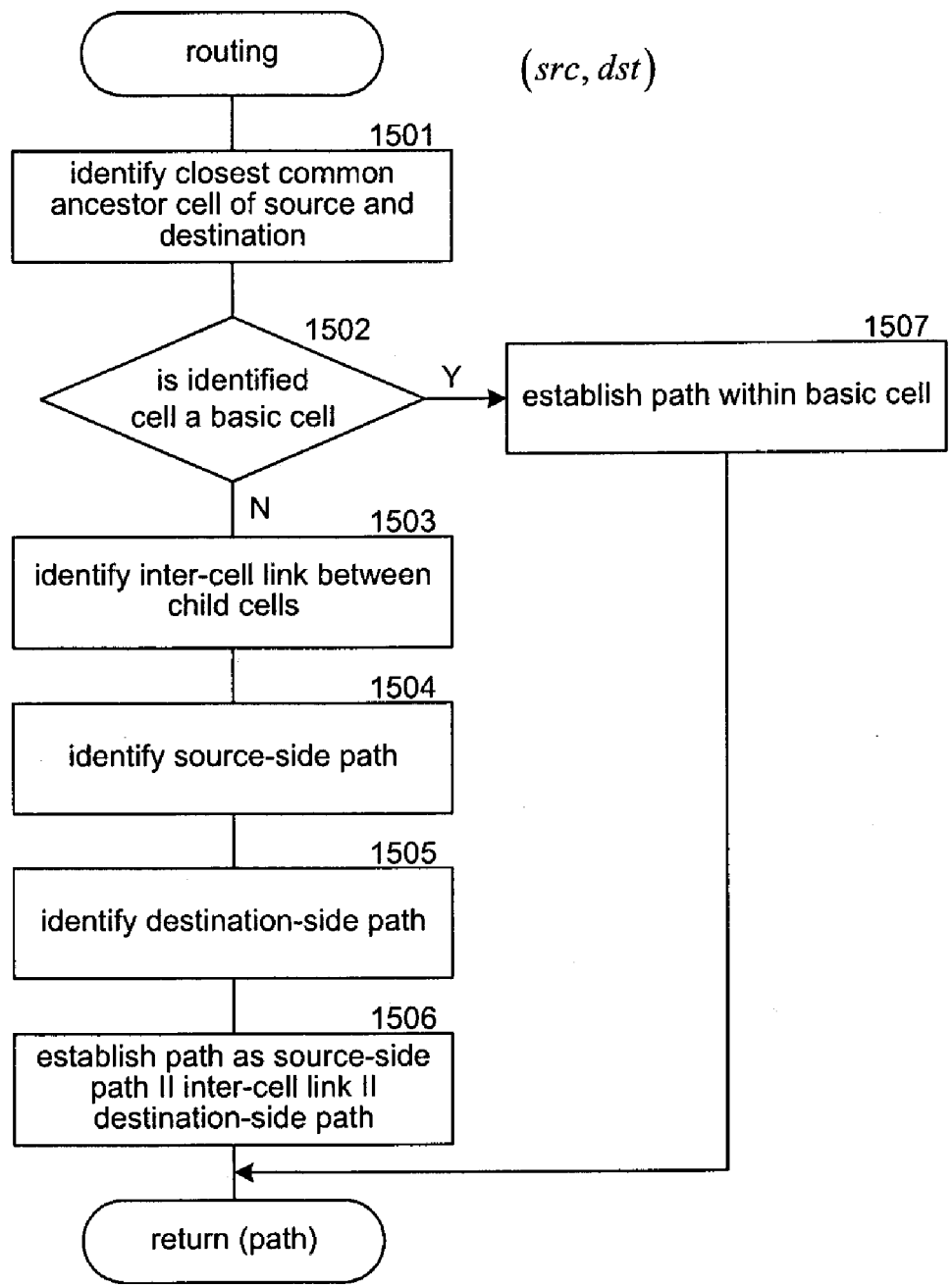
FIG. 15 is a flow diagram that illustrates high-level processing of a routing component of the multi-level interconnection network in some embodiments.

FIG. 15 is a flow diagram that illustrates high-level processing of a routing component of the multi-level interconnection network in some embodiments. The routing component establishes a path from a source to a destination without considering failed links. The component is passed the identifiers of a source server and a destination server. In block 1501, the component identifies the closest common ancestor cell of the source server and the destination server. In decision block 1502, if the closest common ancestor cell is a basic cell, then the source server and the destination server are in the same basic cell and the component continues at block 1507, else the component continues at block 1503. In block 1503, the component identifies an inter-cell link between the child cells of the closest common ancestor cell that contains the source server and the destination server. In block 1504, the component identifies a source-side path from the source server to a source-side server of the identified inter-cell link. In block 1505, the component identifies a destination-side path from the destination-side server of the identified inter-cell link to the destination server. The component may recursively invoke the routing component to identify the source-side path and the destination-side path. In block 1506, the component establishes a path from the source server to the destination server as the concatenation of a source-side path, the identified inter-cell link, and the destination-side path. The component then returns the path. In block 1507, the component establishes a path from the source server to the destination server as the path within the basic cell and returns the path.

Figure 16:
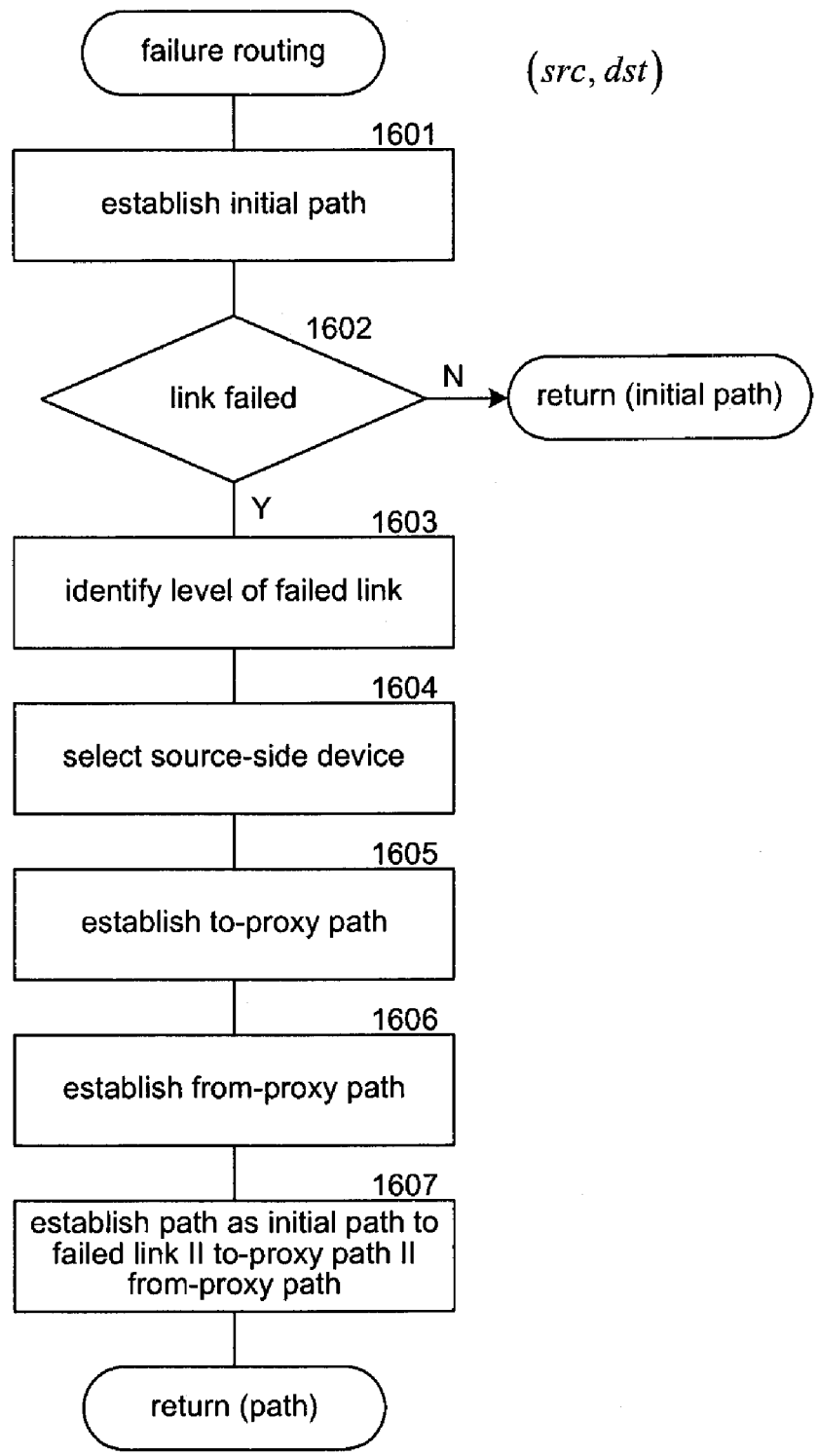
FIG. 16 is a flow diagram that illustrates high-level processing of a failure routing component of the multi-level interconnection network in some embodiments.

FIG. 16 is a flow diagram that illustrates high-level processing of a failure routing component of the multi-level interconnection network in some embodiments. The component modifies a path between a source server and a destination server when a failure along the path has been detected. The component is passed identifiers of the source server and a destination server. In block 1601, the component establishes an initial path between the source server and the destination server by invoking the routing component of FIG. 15. In decision block 1602, if there is a failure along the path, the component continues to block 1603, else the component returns the initial path. In block 1603, the component identifies the level of the failed link. In block 1604, the component selects a source-side proxy server that is in a sibling cell of the cell that contains the source-side server of the failed link. In block 1605, the component establishes a to-proxy path from the source-side server to the source-side proxy server. In block 1606, the component establishes a from-proxy path from the source-side proxy server to the destination server. In block 1607, the component establishes the path as the concatenation of the initial path to the source-side server, the to-proxy path, and the from-proxy path. The component then returns the path.

Figure 17:
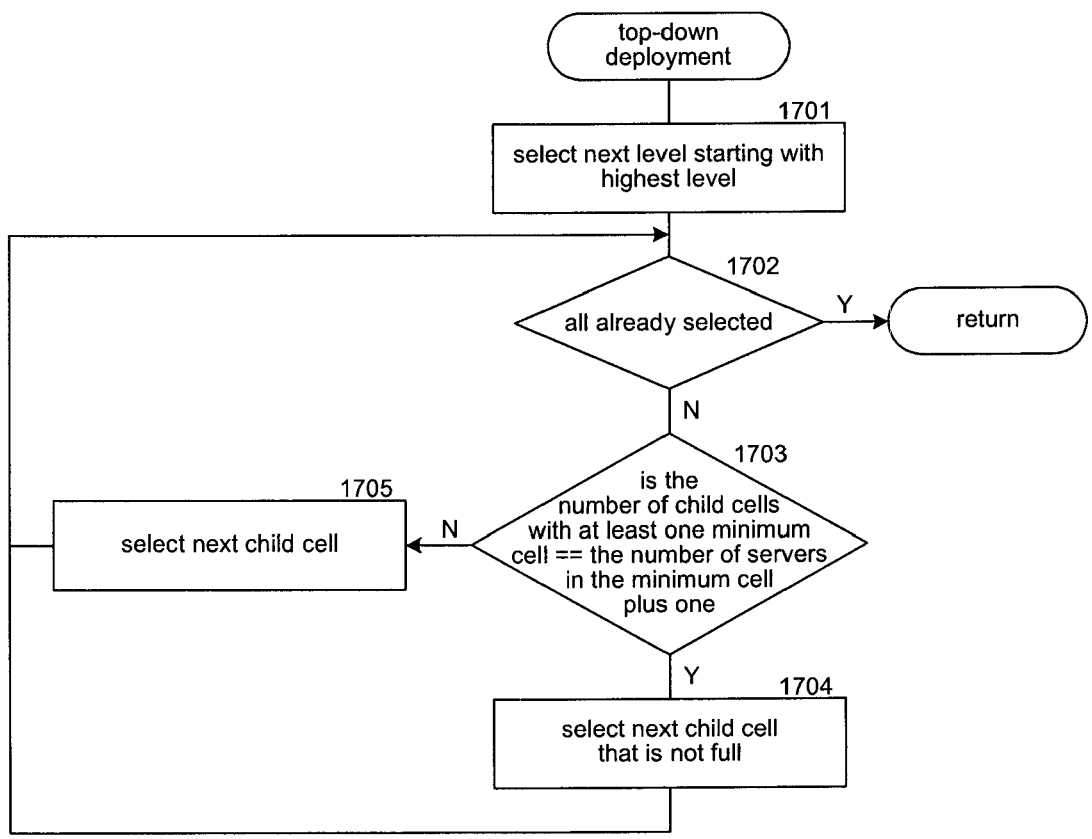
FIG. 17 is a flow diagram that illustrates the processing of a top-down deployment component of the multi-level interconnection network in some embodiments.

FIG. 17 is a flow diagram that illustrates the processing of a top-down deployment component of the multi-level interconnection network in some embodiments. The component may be invoked repeatedly for each minimum cell that is to be added next to the network. The component returns an index of a cell in each level that is to contain the minimum cell. The network has a highest level cell and a minimum cell level. The minimum cell has a certain number of servers, referred to as its server number. The component loops selecting each level from the highest level to the level next above the minimum cell level. In block 1701, the component selects the next level starting with the highest level. In decision block 1702, if all such levels have already been selected, then the component returns, else the component continues at block 1703. In decision block 1703, if the number of child cells of the selected level that have one minimum cell already assigned is greater than one more than the server number of the minimum cell, then the component continues at block 1704, else the component continues at block 1705. In block 1704, the component selects the next child cell of the selected level that is not full in index order and loops to block 1701 to select the next level. In block 1705, the component selects the next child cell of the selected level that has not been assigned a minimum cell in index order and then loops to block 1701 to select the next level.

In the following, the multi-level interconnection network, referred to as a DCell ("Data Center Cell") or Cell, is described. DCell uses servers equipped with multiple network ports and mini-switches to construct its recursively defined architecture. In DCell, a server is connected to several other servers and a mini-switch via communication links, which are assumed to be bidirectional and of the same capacity. A high-level DCell is constructed from many low-level DCells. A $k^{th}$ level-k DCell (k is greater than or equal to 0) is denoted as $DCell_k$.

A basic cell, referred to as a $DCell_0$, is the building block to construct larger DCells. A $DCell_0$ has n servers (or server number n) and a mini-switch. In the example of FIG. 3, n is equal to 3, and in the example of FIG. 4, n is equal to 2. All servers in a $DCell_0$ are connected to the mini-switch and are thus fully connected with each other. In a typical multi-level interconnection network, n is a small integer (e.g., $n \leq 8$). In some embodiments, the mini-switch may be a commodity 8-port switch with a speed of 1 Gb/s or 10 Gb/s per port.

A level-1 $DCell_1$ is constructed using n+1 $DCell_0$s. In a $DCell_1$, each $DCell_0$ is connected to all the other $DCell_0$s with one link, referred to as a first level link. In the example of FIG. 3, the $DCell_1$ has n+1=4 of $DCell_0$s. The $DCell_0$s are connected by assigning each server an identifier that is 2-tuple $[a_1, a_0]$, where $a_1$ and $a_0$ are the level-1 and level-0 indexes, respectively. Thus $a_1$ and $a_0$ take values from [0, 4) and [0, 3). The two servers with 2-tuples [i, j−1] and [j, i] are connected with a link for every i and every j>i. The linking results in a $DCell_1$ as shown in FIG. 3. Therefore, each server in a $DCell_1$ has two links. One link, referred to as a level-0 link, connects to its mini-switch, hence to other servers within its own $DCell_0$. The other link, referred to as a level-1 link, connects to a node in another $DCell_0$.

To facilitate the DCell construction, each server in a $DCell_k$ is assigned a (k+1)-tuple $[a_k, a_{k-1}, \ldots, a_1, a_0]$. The value $[a_k]$ is a prefix indicating which $DCell_{k-1}$ contains the server. Similarly, the value $[a_k, a_{k-1}, \ldots, a_{i+1}]$ (i>0) is a prefix indicating which $DCell_i$ contains the server. Each server can be equivalently identified by a unique integer identifier $uid_k$ with a value ranging from 0 to $t_k$, where $t_k$ represents the number of servers in or server number of a $DCell_k$ and is defined recursively by the following:

$$t_k = g_k \times t_{k-1}$$

$$g_k = t_{k-1} + 1$$

where k>0, $t_0$=n (which is the number of servers in a $DCell_0$), and $g_0$=1. The value $g_k$ denotes the number of $DCell_{k-1}$s cells in a $DCell_k$.

A mapping between a unique integer identifier of a server and its (k+1)-tuple is a bijection. The unique integer identifier $uid_k$ may be calculated from the (k+1)-tuple by the following equation:

$$uid_k = a_0 + \Sigma_{j=1}^{k}(a_j \times t_{j-1})$$

The (k+1)-tuple of a server can also be derived from its unique identifier by the inverse operation. A server in $DCell_k$ is represented as $[a_k, uid_{k-1}]$, where $a_k$ indicates which $DCell_{k-1}$ contains the server and $uid_{k-1}$ is the unique identifier of the server within $DCell_{k-1}$.

Figure 18:
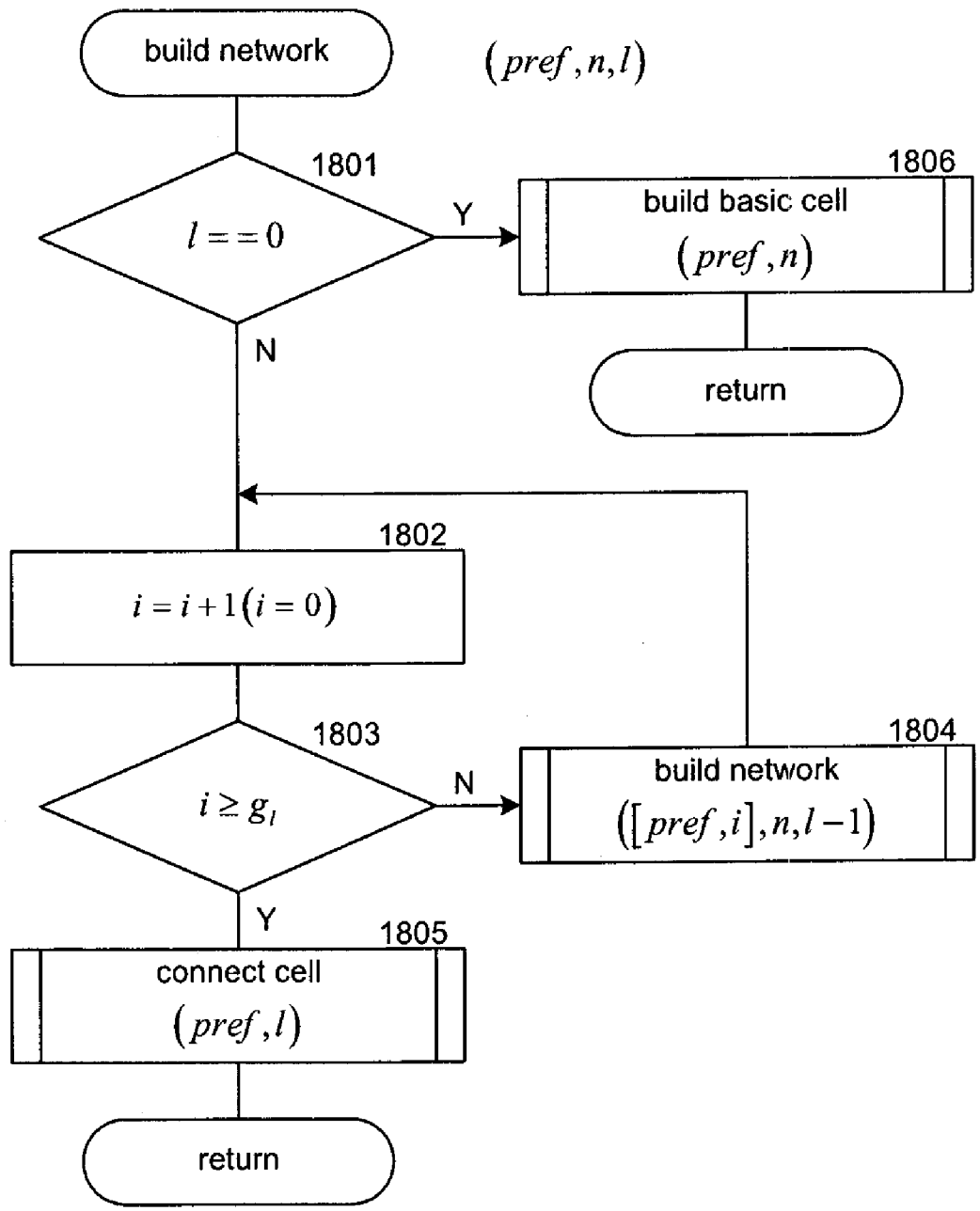
FIG. 18 is a flow diagram that illustrates the processing of a build network component for a multi-level interconnection network in some embodiments.

FIG. 18 is a flow diagram that illustrates the processing of a build network component for a multi-level interconnection network in some embodiments. The component recursively assigns identifiers to basic cells and specifies links between the servers of the network. The component has three parts. Part I checks whether the component is at the basic cell level (i.e., $DCell_0$). If so, it connects all the n servers to a corresponding switch and ends the recursion. Part II recursively constructs $g_l$ number of $DCell_{l-1}$s. Part III interconnects these $DCell_{l-1}$s, where any two $DCell_{l-1}$s are connected with one link. The component connects servers [i, j−1] and [j, i] via a link to fully connect $DCell_0$s assigned to a $DCell_l$. A similar procedure is used to connect the $DCell_{l-1}$s in a $DCell_l$. Each server in a $DCell_k$ has k+1 links. The one link, called a level-0 link, connects each server to a switch that interconnects the servers in a $DCell_0$. The other link, a level-1 link, connects to a server in the same $DCell_1$ but in a different $DCell_0$. Similarly, the level-i link connects a server to a different $DCell_{i-1}$ within the same $DCell_i$.

The component is passed a prefix, the server number of the basic cell, and a level. In decision block 1801, if the level is zero, then the component continues at block 1806, else the component continues at block 1802. In blocks 1802-1804, the component loops recursively invoking the build network component. In block 1802, the component selects the next child cell of the passed level in index order starting with the cell indexed by zero (i=0). In decision block 1803, if all such child cells have already been selected, then the component continues at block 1805, else the component continues at block 1804. In block 1804, the component recursively invokes the build network routine passing a prefix with the index of the selected child cell concatenated, the server number of the basic cell, and the passed level minus one (implementing Part II) and then loops to block 1802 to select the next child cell. In block 1805, the component invokes a connect cell component passing a prefix in the passed level to connect the child cells of the passed level (implementing Part III) and then returns. In block 1806, the component invokes a build basic cell component (implementing Part I) to build a basic cell and then returns.

Figure 19:
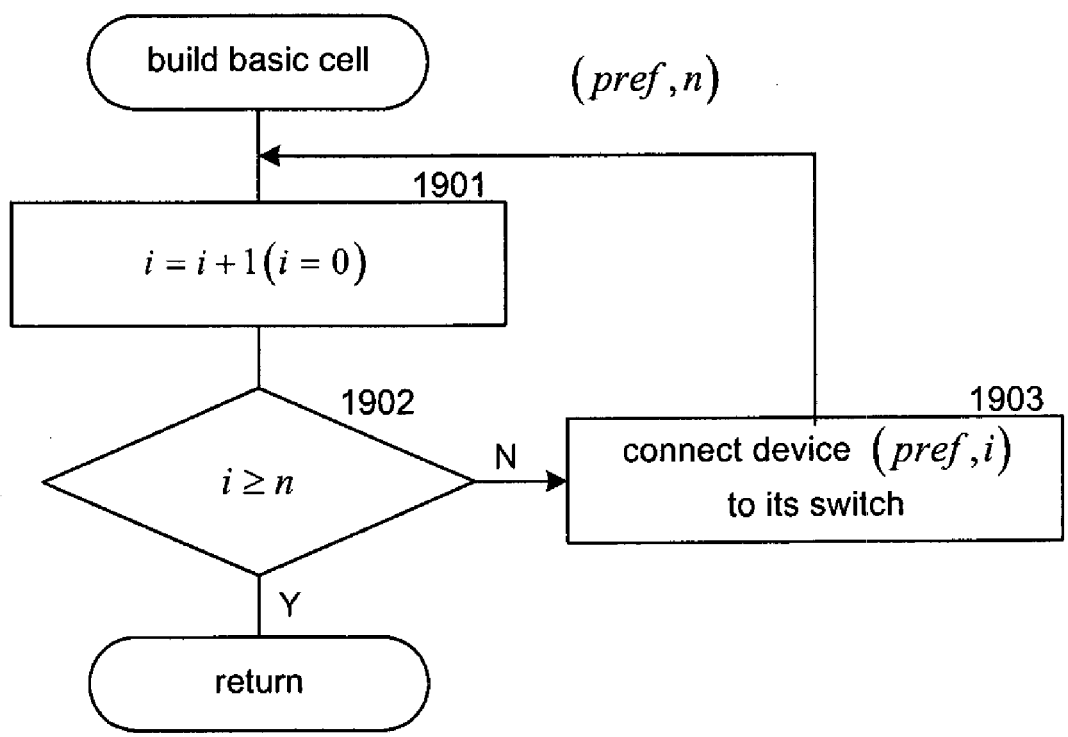
FIG. 19 is a flow diagram that illustrates the processing of the build basic cell component of a multi-level interconnection network in some embodiments.

FIG. 19 is a flow diagram that illustrates the processing of the build basic cell component of a multi-level interconnection network in some embodiments. The component is passed a prefix and the server number of the basic cell and connects the servers of a basic cell and assigns an identifier to each server within the basic cell. In block 1901, the component selects the index of the next server of a basic cell. In decision block 1902, if all the indexes of the servers have already been selected, then the component returns, else the component continues at block 1903. In block 1903, the component assigns to a server an identifier that is the prefix concatenated with the selected index and connects that server to the switch for the basic cell and then loops to block 1901 to select the index of the next server.

Figure 20:
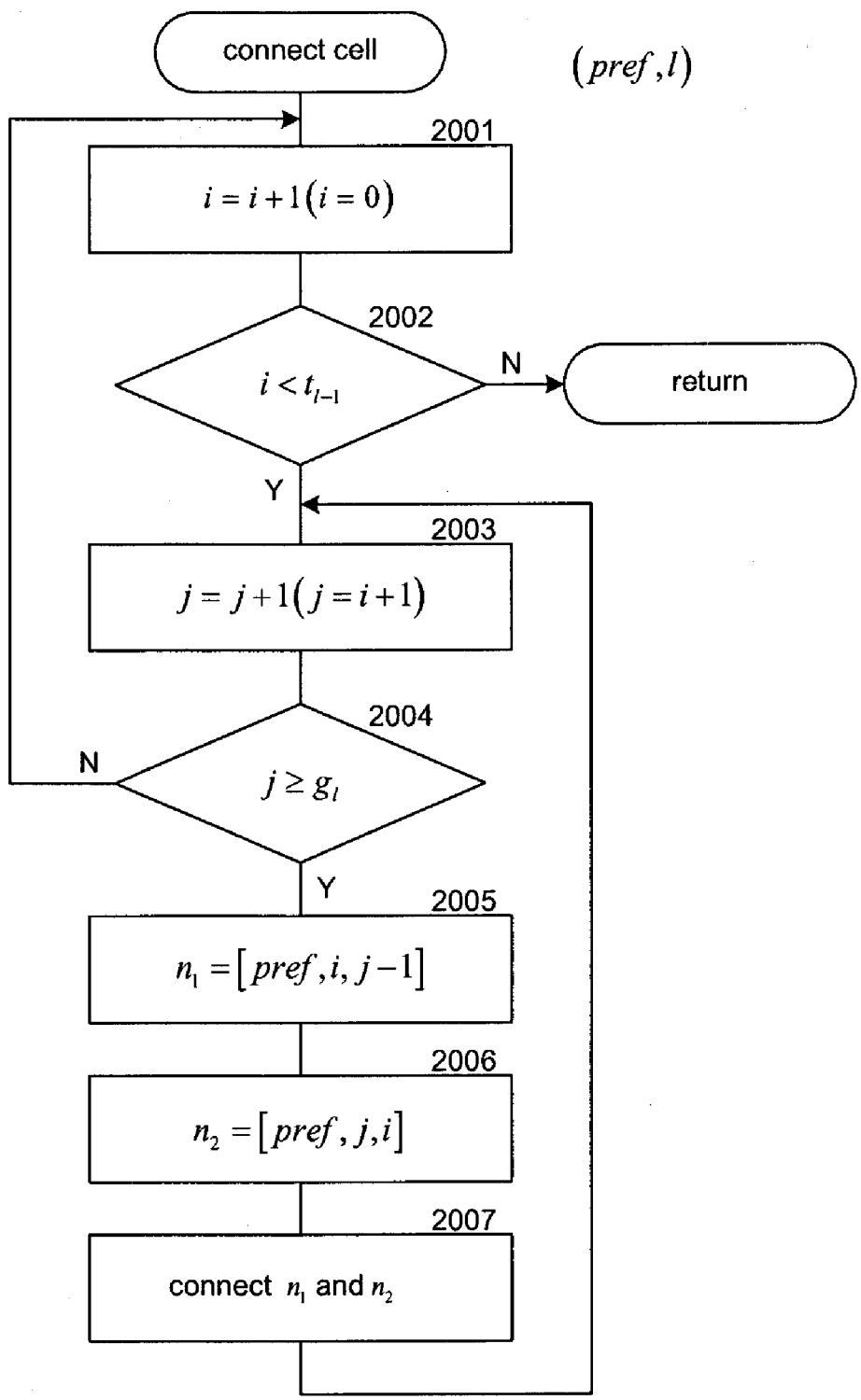
FIG. 20 is a flow diagram that illustrates the processing of a connect cell component of the multi-level interconnection network in some embodiments.

FIG. 20 is a flow diagram that illustrates the processing of a connect cell component of the multi-level interconnection network in some embodiments. The component is passed a prefix of a cell and a level whose child cells are to be connected with links of that level. In block 2001, the component selects the next child cell in index order. In decision block 2002, if all the child cells have already been selected, then the component returns, else the component continues at block 2003. In blocks 2003-2007, the component loops choosing each index of a child cell that is greater than the selected index. The component connects the child cell of the selected index to each child cell of the chosen indexes. In block 2003, the component chooses the next index of a child cell that is greater than the selected identifier. In decision block 2004, if all such indexes have already been chosen, then the component loops to block 2001 to select the next index, else the component continues at block 2005. In block 2005, the component sets the identifier for one of the servers to be connected. In block 2006, the component sets the identifier for the other server to be connected. In block 2007, the component designates that identified servers are to be connected and then loops to block 2003 to choose the next index.

The routing algorithm follows a divide-and-conquer approach. If the source server src and the destination server dst are in the same $DCell_k$ but in two different $DCell_{k-1}s$, the routing algorithm first calculates the inter-cell link $(n_1, n_2)$ that connects the two $DCell_{k-1}s$. The routing algorithm then divides its processing in half to find the two sub-paths from the source server src to the source-side server $n_1$ and from the destination-side server $n_2$ to the destination server dst. The final path is the combination of the two sub-paths and inter-cell link $(n_1, n_2)$.

Figure 21:
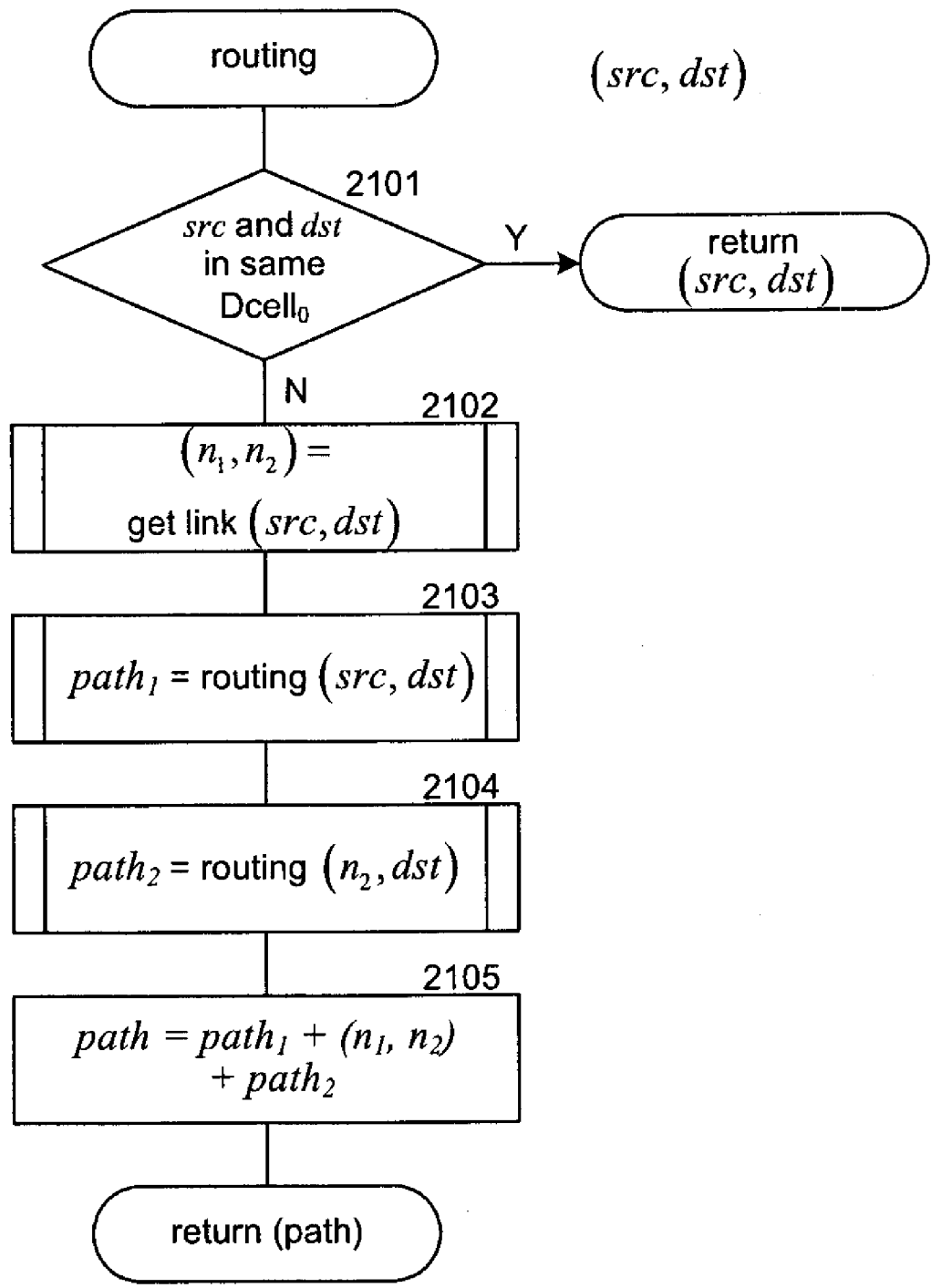
FIG. 21 is a flow diagram that illustrates the processing of a routing component in some embodiments.

FIG. 21 is a flow diagram that illustrates the processing of a routing component in some embodiments. The component is passed identifiers of a source server and a destination server and returns a path from the source server to the destination server. The component is recursively invoked to identify a source-side path and a destination-side path. In decision block 2101, if the source server and destination server are in the same basic cell, the component returns the path from the source server to the destination server through the switch, else the component continues at block 2102. In block 2102, the component invokes the get link component to retrieve the inter-cell link of the closest common ancestor cell of the source server and the destination server. In block 2103, the component recursively invokes the routing component passing the identifier of the source server and an identifier of the source-side server of the identified inter-cell link. In block 2104, the component recursively invokes the routing component passing the identifier of the destination-side server of the identified inter-cell link and the identifier of the destination server. In block 2105, the component concatenates the source-side path, the identified inter-cell link, and the destination-side path to form the overall path and then returns that path.

Figure 22:
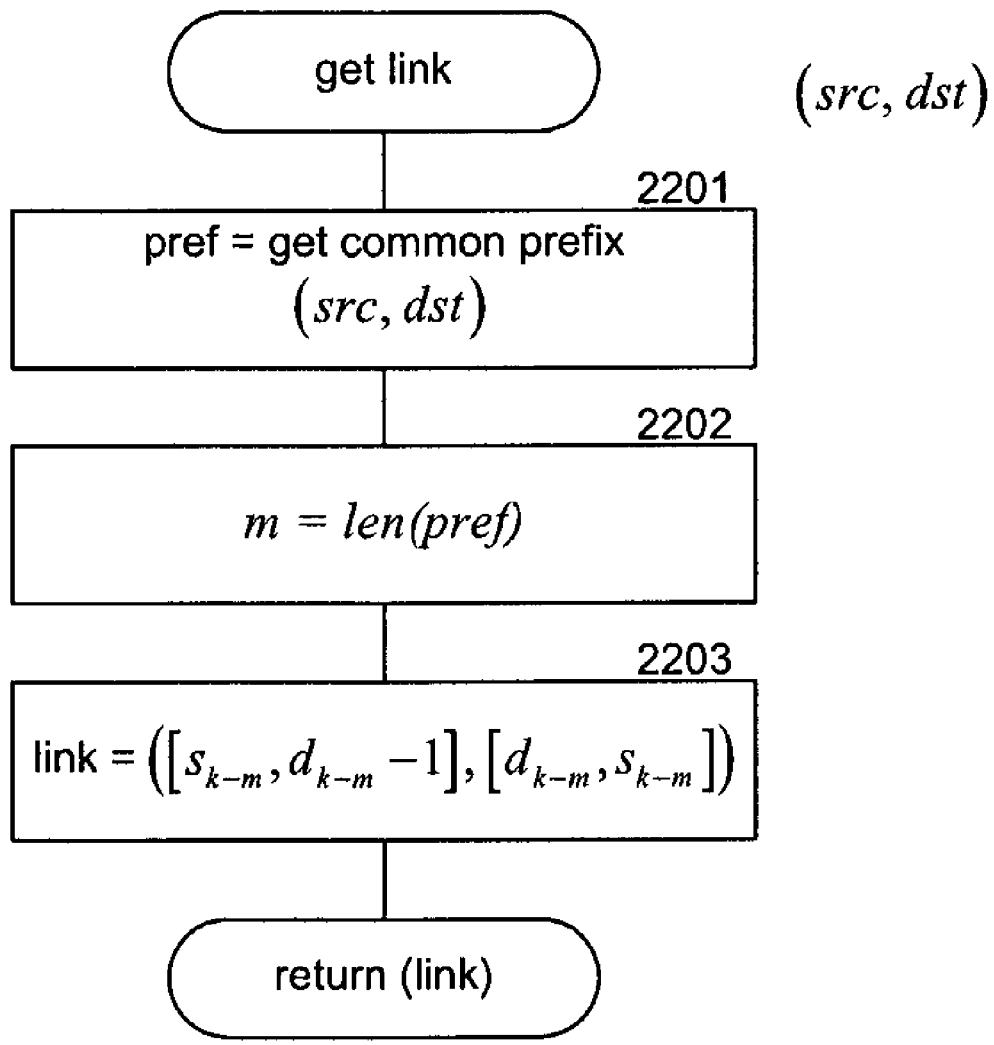
FIG. 22 is a flow diagram that illustrates the processing of a get link component of the multi-level interconnection network in some embodiments.

FIG. 22 is a flow diagram that illustrates the processing of a get link component of the multi-level interconnection network in some embodiments. The component identifies the inter-cell link between the source server and destination server. In block 2201, the component identifies the closest common ancestor cell of the source server and the destination server based on a common prefix of the tuples identifying the source server and the destination server. In block 2202, the component determines the length of the prefix. In block 2203, the component identifies the inter-cell link by the source-side cell and the destination-side cell and then returns that link. The link can be directly derived from the identifiers of the two child cells. If $s_{k-m}$ and $d_{k-m}$ ($s_{k-m}<d_{k-m}$) are the identifiers of the two child cells, then the link that connects these two child cells is $([s_{k-m}, d_{k-m}-1], [d_{k-m}, s_{k-m}])$ where $d_{k-m}-1$ is the index of the source-side server of the link in child cell s, and $s_{k-m}$ is the index of the destination-side server of the link in child cell d.

The multi-level interconnection network uses a distributed, fault-tolerant routing algorithm without global link state information to reduce the impact of a failure on routing. The failure routing algorithm employs the routing algorithm described above and a broadcast algorithm to broadcast link state information within the child cells of a parent cell. The failure routing algorithm addresses three types of failures: server failure, rack failure, and link failure. A link failure is a basic failure since all the failures result in a link failure. Link failure management is a basic part of the failure routing algorithm. The failure routing algorithm uses a local rerouting algorithm, a local link state algorithm, and a jump-up routing algorithm to address link failure, server failure, and rack failure, respectively.

The failure routing algorithm uses a local rerouting algorithm to bypass failed links that are part of a path established by the routing algorithm. The local rerouting algorithm uses local decisions when modifying a path for rerouting packets. The local rerouting algorithm uses an initial path from a source server src to a destination server dst established using the routing algorithm. When a server $n_1$ along the path receives a packet and determines that the link $(n_1, n_2)$ along the initial path has failed, the failure routing algorithm performs the local rerouting algorithm at the source-side server $n_1$ of the failed link. The local rerouting algorithm at the source-side server $n_1$ first calculates the level of the failed link $(n_1, n_2)$, represented by l. The source-side server $n_1$ and the destination-side server $n_2$ are in the same $DCell_l$ but in two different $DCell_{l-1}s$. Since there are $g_l$ $DCell_{l-1}s$ inside this $DCell_l$, the local rerouting algorithm selects a $DCell_{l-1}$ that is different from the ones that contain the source-side server $n_1$ and the destination-side server $n_2$. The local rerouting algorithm selects the link, represented as link $(p_1, p_2)$, that connects the selected $DCell_{l-1}$ and the one that contains the source-side server $n_1$. The local rerouting algorithm reroutes the path from the source-side server $n_1$ to server $p_2$, which is a source-side proxy server. Upon receiving the packet, the source-side proxy server $p_2$ uses the routing algorithm to establish a path from the source-side proxy server $p_2$ to the destination server dst and forwards the packet along that path.

The local rerouting algorithm cannot completely address server failures because it is based on the topology of the network and does not use link or server state information. An example of a failure that the local rerouting algorithm cannot adequately address is as follows. The initial path from a source server src to a destination server established by the routing algorithm may contain a sub-path through server $q_2$ represented as $\{(q_1, q_2), (q_2, q_3)\}$. The level of the link $(q_1, q_2)$ may be 1 and the level of the link $(q_2, q_3)$ may be 3. When server $q_1$ receives a packet, it determines that link $(q_1, q_2)$ is down. The cause of the link being down may have been because server $q_2$ failed, but server $q_1$ cannot determine whether the link or the destination-side server of the link has failed. The local rerouting algorithm selects a source-side proxy server in another $DCell_2$ and generates a path from the source-side proxy server to the destination-side server $q_2$ using the routing algorithm. However, the routing algorithm, which does not factor in the unavailability of a link, will always establish a path that includes server $q_2$, which has failed. Another example is when the last server before the destination server dst has failed, such last server is trapped in a dilemma. If the destination server dst fails, it should not perform the local rerouting algorithm, but if the link between the last server and the destination server dst has failed, it should perform the local rerouting algorithm.

Figure 23:
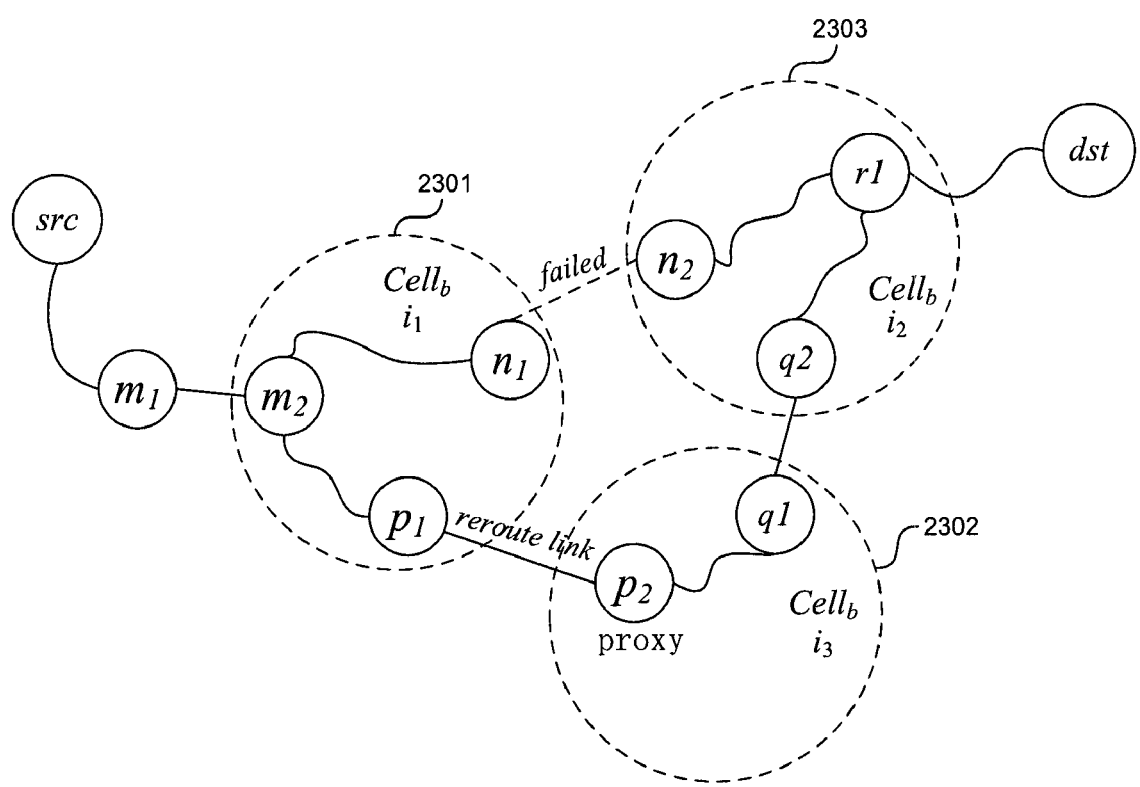
FIG. 23 illustrates a server failure that can be addressed using local link state information.

The failure routing algorithm uses local link state information to solve this dilemma. The failure routing algorithm uses a link state routing algorithm (that in turn uses a Dijkstra-based algorithm) for intra-$DCell_b$ routing and the routing algorithm and the local rerouting algorithm for inter-$DCell_b$ routing. Within a $DCell_b$, each server broadcasts the status of all its (k+1) links periodically or when it detects link failure to all the other servers of that $DCell_b$. Each server thus knows the status of all the incoming and outgoing links in its $DCell_b$. FIG. 23 illustrates a server failure that can be addressed using local link state information. $DCell_b$s 2301, 2302, and 2303 are along possible paths from the source server src to the destination server dst. Upon receiving a packet, a server $m_2$ in $DCell_b$ executing the failure routing algorithm will use the routing algorithm to calculate the remainder of the path to the destination server dst. The failure routing algorithm identifies the link leading out of $DCell_b$ along the path as link $(n_1, n_2)$. The failure routing algorithm uses the local link state routing algorithm to perform intra-DCell routing from server $m_2$ to server $n_2$. Upon determining from the local link state information that link $(n_1, n_2)$ is unavailable (possibly because server $n_2$ has failed), server $m_2$ uses the local rerouting algorithm to select a source-side proxy server $p_1$. When server $p_1$ receives the packet, the failure routing algorithm uses the routing algorithm to establish a path from server $p_1$ to destination server dst, which necessarily will avoid link $(n_1, n_2)$ and server $n_2$, irrespective of whether that link or server has failed.

The failure routing algorithm that uses local link state routing cannot adequately address the situation when the entire $DCell_b$ 2303 of FIG. 23 fails. In particular, the algorithm will route the packet endlessly around $DCell_b$ 2302 since all the re-routed paths need to go through $r_1$. To address this situation, the failure routing algorithm using a jump-up routing algorithm. Upon receiving the rerouted packet (implying link $(n_1, n_2)$ has failed), server $p_2$ checks whether link $(q_1, q_2)$ is unavailable. If link $(q_1, q_2)$ is unavailable, it may be a good indication that the entire $DCell_b$ 2303 has failed. To avoid $DCell_b$ 2303 entirely, the jump-up routing algorithm executing at server $p_2$ selects a source-side proxy from a DCell with a higher level (i.e., it jumps up). (However, if the destination server dst is in the failed $DCell_b$ 2303, a packet will not be able to reach the destination server dst with the local rerouting algorithm or the jump-up routing algorithm.) To remove packets from the network that may not ever be able to reach their destination servers, the failure routing algorithm uses a retry count and a time-to-live count. The failure routing algorithm adds to a packet header a retry count, which is decremented each time a local rerouting is performed, and a time-to-live count, which is decremented by each server that receives the packet. When either count reaches zero, the failure routing algorithm drops the packet and sends a failure message to the source server.

Figure 24:
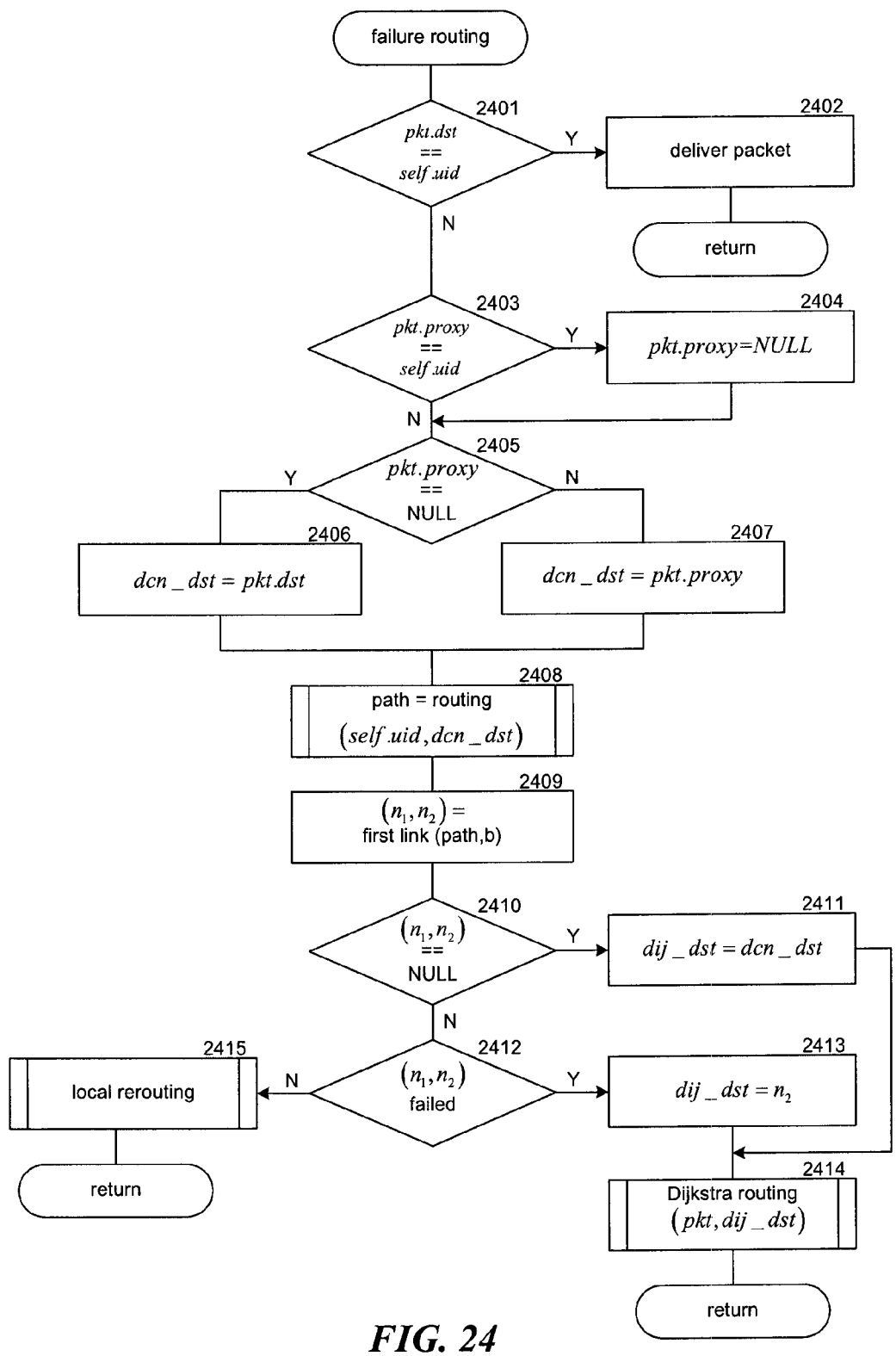
FIG. 24 is a flow diagram that illustrates the processing of a failure routing component of the multi-level interconnection network in some embodiments.

FIG. 24 is a flow diagram that illustrates the processing of a failure routing component of the multi-level interconnection network in some embodiments. The component uses the routing algorithm, the local rerouting algorithm, the link state routing algorithm, and the jump-up routing algorithm. The component is invoked when a server receives a packet. In decision block 2401, if this server is the destination server, then the component delivers the packet to the application in block 2402 and returns, else the component continues at block 2403. In decision block 2403, if this server is the proxy server designated in the packet, then the component sets the proxy of the packet to null in block 2404. The component then continues at block 2405. In decision block 2405, if the proxy of the packet is null, then the component sets a destination variable to the destination server of the packet in block 2406, else the component sets a destination variable to the proxy server of the packet in block 2407. In block 2408, the component invokes the routing algorithm to generate a path from this server to the server of the destination variable. In block 2409, the component identifies the first link outside of $DCell_b$ along the path. In decision block 2410, if the first link is null, then this server and the server of the destination variable are in the same $DCell_b$. If so, the component continues at block 2411, else the component continues at block 2412. In block 2411, the component sets a Dijkstra destination variable to the destination variable and continues at block 2414 to invoke a Dijkstra routing component passing the packet and the Dijkstra destination variable before returning. In decision block 2412, if there is a first link and it has failed, then the component continues at block 2415, else the component continues at block 2413. In block 2413, the component sets a Dijkstra destination variable to the destination-side server of the first link and invokes the Dijkstra routing component before returning. In block 2415, the component invokes the local rerouting component to avoid the failed link and then returns.

Figure 25:
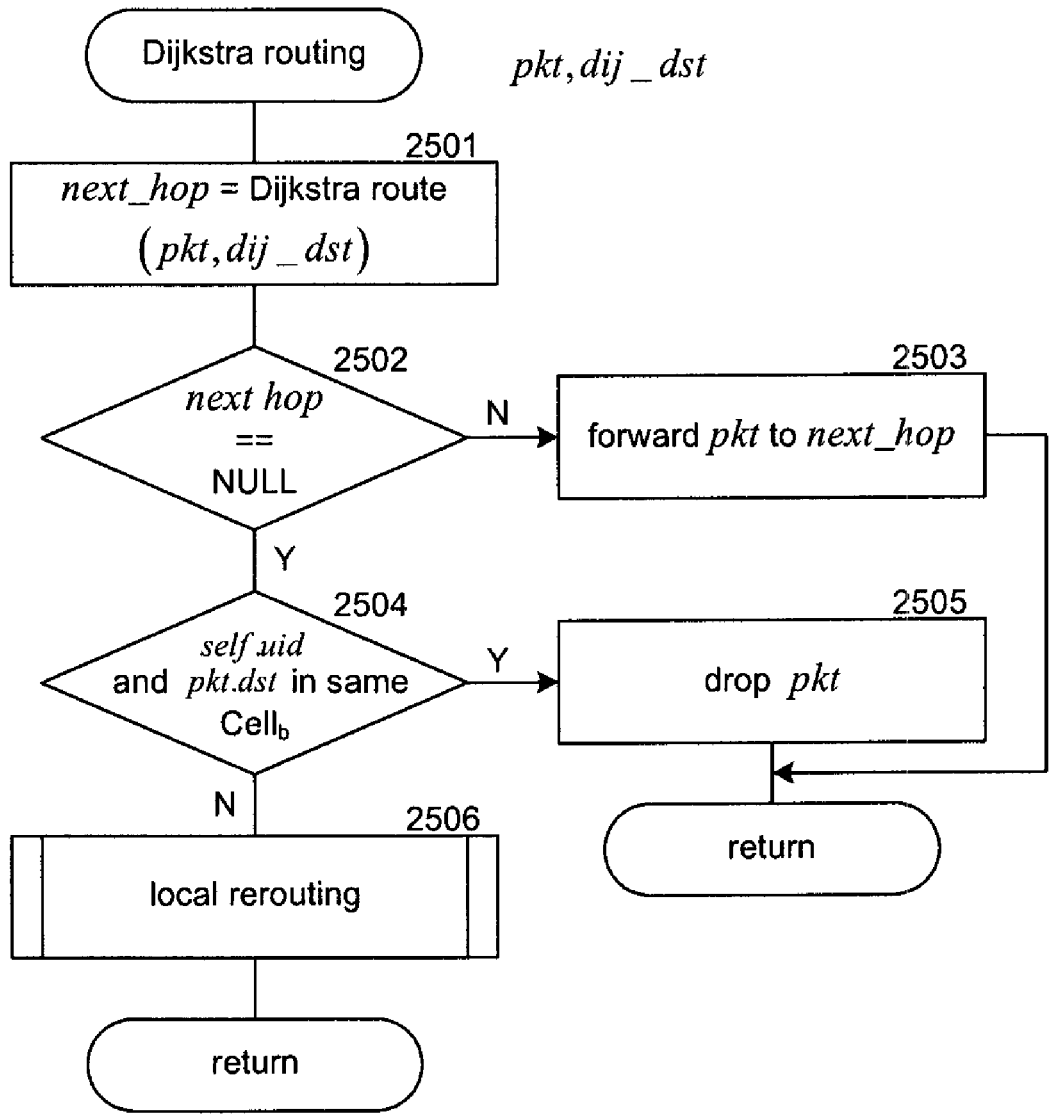
FIG. 25 is a flow diagram that illustrates the processing of a Dijkstra routing component in some embodiments.

FIG. 25 is a flow diagram that illustrates the processing of a Dijkstra routing component in some embodiments. The component is passed a packet along with an indication of a destination server. In block 2501, the component identifies the next server along a route identified by a Dijkstra-based algorithm. In decision block 2502, if there is no next server, then the component continues at block 2504, else the component forwards the packet to the next server in block 2503 and then returns. In decision block 2504, if this server and the destination server are in the same $DCell_b$, then the component drops the packet in block 2505 and returns, else the component continues at block 2506. In block 2506, the component invokes a local rerouting component and then returns.

Figure 26:
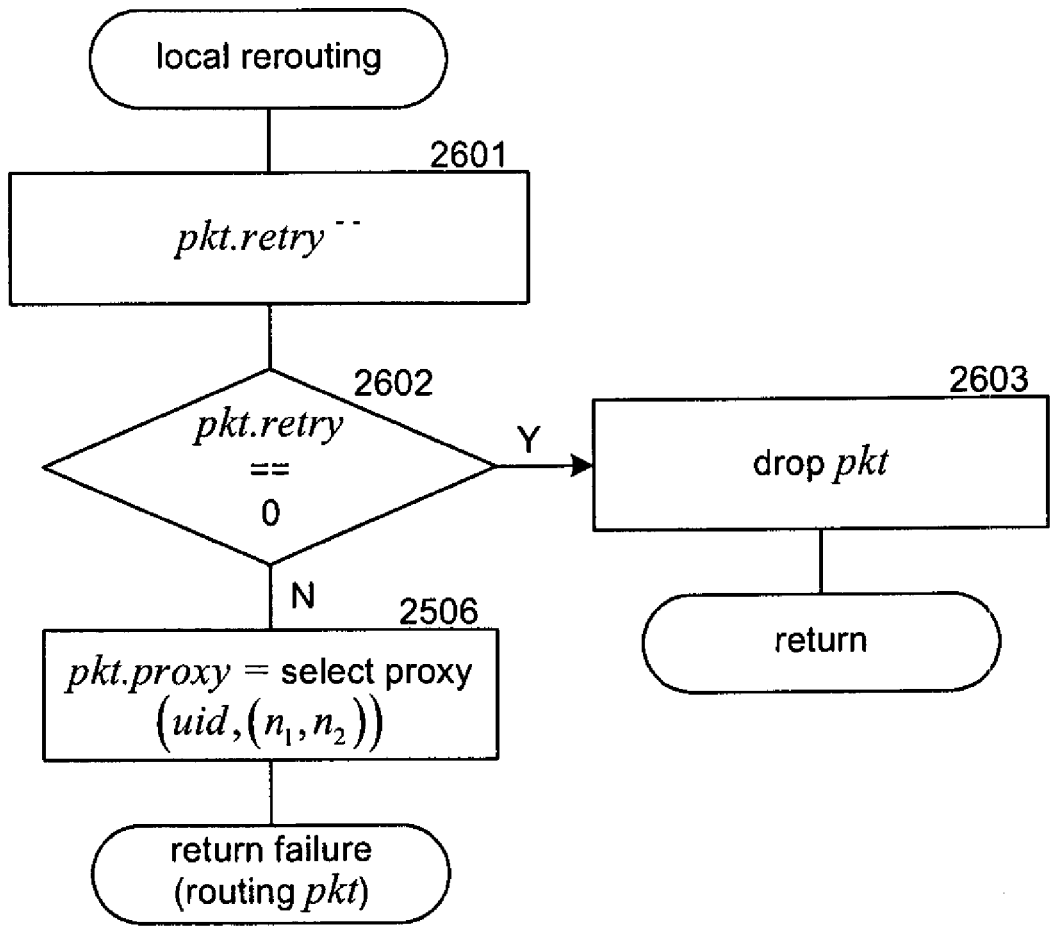
FIG. 26 is a flow diagram that illustrates the processing of the local rerouting algorithm in some embodiments.

FIG. 26 is a flow diagram that illustrates the processing of the local rerouting algorithm in some embodiments. In block 2601, the component decrements a local rerouting retry count of the packet. In decision block 2602, if the retry count is zero, then the component drops the packet in block 2603 and returns, else the packet continues at block 2604. In block 2604, the component selects a proxy and sets the proxy of the packet to the selected proxy. The component then recursively invokes the failure routing component and then returns.

In a large data center, it is unlikely that a full multi-level interconnection network is constructed at one time because servers will typically only be added incrementally upon demand. A straightforward way to gradually build a multi-level interconnection network is to use a bottom-up technique. When a $DCell_0$ is full, a second $DCell_0$ is started as part of a $DCell_1$ that contains both $DCell_0$s. In general, anytime a $DCell_{k-1}$ is full, a new $DCell_k$ is started. The bottom-up technique ensures that no reassigning of identifiers nor rewiring of links is needed when new servers are added as the network is incrementally grown. However, the bottom-up technique may generate interim networks that are not fault-tolerant. For example, when the number of nodes in the system is $2 \times t_{i-1}$, it will form two full $DCell_{i-1}$s connected by a single link. If this link fails, the network is partitioned into two parts.

To reduce the chances of having a "single point of failure," a top-down technique to incrementally build a multi-level interconnection network is used. When constructing a $DCell_k$, the top-down technique starts by building many incomplete $DCell_{k-1}$s but ensures that they are fully connected. Thus, even interim networks are fault-tolerant. The top-down technique uses a minimal quantum of servers to be added at one time that is larger than 1. For example, a $DCell_1$ may be the minimum cell that can be added. Although a $DCell_1$ has 20, 30, or 42 servers when n=4, 5, or 6, the servers can readily be placed in a single rack, which typically can accommodate 20-80 servers. The top-down technique also sets the highest level of the network. If the highest level is 3 and n is 6, the network can connect millions of servers.

Figure 27:
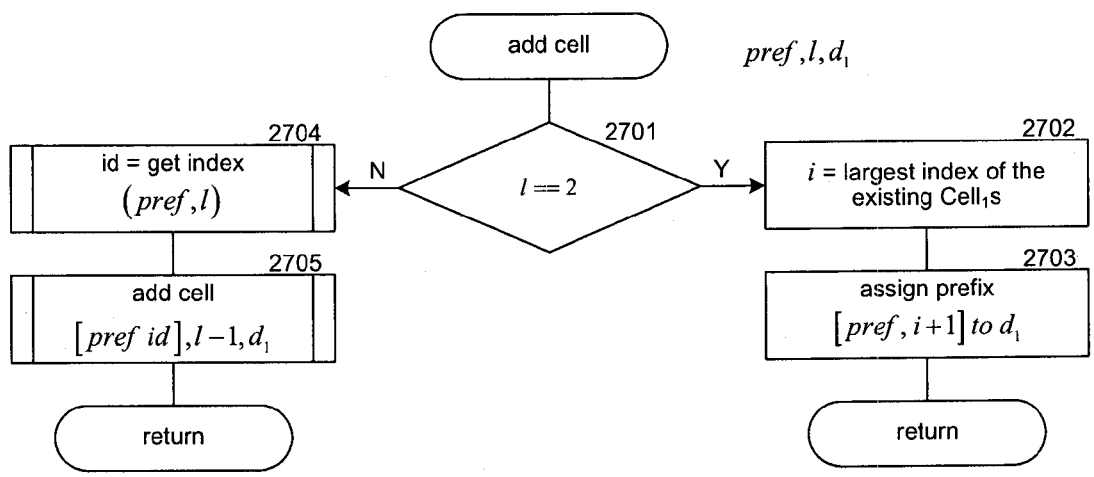
FIG. 27 is a flow diagram that illustrates the processing of an add cell component of the top-down technique in some embodiments.

FIG. 27 is a flow diagram that illustrates the processing of an add cell component of the top-down technique in some embodiments. The component is invoked to identify the identifier of the next minimum cell to be added incrementally to the network. In this example, the minimum cell is assumed to be a first level cell. The component is passed a prefix of the minimum cell identifier, a current level, and the minimum cell to be added. In decision block 2701, if the passed level is 2, then the component continues at block 2702 to set the identifier for the minimum cell, else the component continues at block 2704. In block 2702, the component selects the largest index of the existing $DCell_1$s within the $DCell_2$ indicated by the prefix. In block 2703, the component assigns the prefix plus one more than the largest index to the minimum cell and then returns. In block 2704, the component invokes a get index component to identify the index of a child cell of the cell identified by the passed prefix. In block 2705, the component recursively invokes the add cell component passing a prefix of the passed prefix plus the index of the child cell, the next lower level, and a minimum cell. The component then returns.

Figure 28:
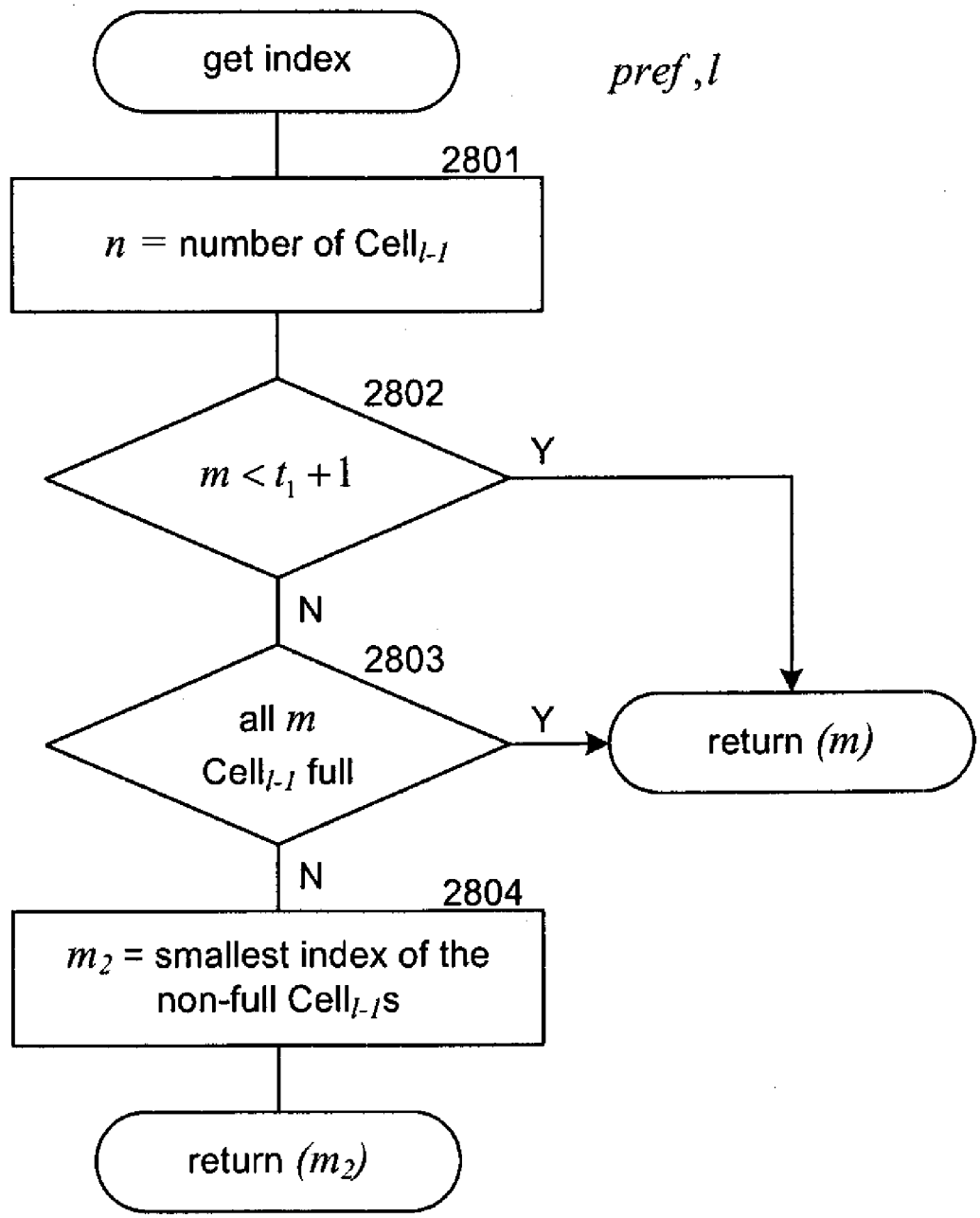
FIG. 28 is a flow diagram that illustrates the processing of a get index component of the top-down technique in some embodiments.

FIG. 28 is a flow diagram that illustrates the processing of a get index component of the top-down technique in some embodiments. The component is passed a prefix and a level. The component identifies the next child cell to which a minimum cell is to be added and returns its index. In block 2801, the component determines the number of child cells within the passed level. In decision block 2802, if the number of child cells is less than the number of servers in the minimum cell plus one, then the component returns that number as the index, else the component continues at block 2803. In decision block 2803, if all the existing child cells are full, then the component returns that index, else the component continues at block 2804. In block 2804, the component identifies the smallest index of a non-full child cell and returns that index.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A collection of devices interconnected via communication links, the collection of devices being organized hierarchically into levels, the collection including:
   a plurality of basic cells, each basic cell having a number of devices connected via a communication mechanism, the number of devices being the same for each basic cell;
   a first level for organizing the basic cells into a first level cell, a number of basic cells of the first level cell being one more than the number of devices in a basic cell, each pair of basic cells of a first level cell being directly connected to each other via only one first level link, each first level link directly connecting a device of one basic cell of a pair to a device of the other basic cell of the pair such that no device is connected to more than one first level link; and
   a second level for organizing a plurality of first level cells into a second level cell, a number of first level cells of the second level cell being one more than the number of devices within each first level cell, each pair of first level cells of the second level cell being directly connected to each other via only one second level link, each second level link directly connecting a device of one first level cell of a pair to a device of the other first level cell of the pair such that no device is connected to more than one second level link.

2. The collection of devices of claim 1 including:
   a third level for organizing a plurality of second level cells into a third level cell, a number of second level cells of the third level cell being one more than the number of devices within each second level cell, each pair of second level cells of the third level cell being directly connected to each other via only one third level link, each third level link directly connecting a device of one second level cell of a pair to a device of the other second level cell of the pair such that no device is connected to more than one third level link.

3. The collection of devices of claim 1 wherein the number of devices in the basic cell is greater than two.

4. The collection of devices of claim 1 wherein the devices are servers of a data center.

5. The collection of devices of claim 1 wherein the devices of a basic cell are connected via a switching device.

6. The collection of devices of claim 1 wherein each first level cell is provided with a unique index within the second level cell, each basic cell within each first level cell is provided with a unique index within that first level cell, and each device within each basic cell is provided with a unique index within that basic cell such that each device of the network is uniquely identified by a sequence of unique indexes that includes the unique index of the device within its basic cell, the unique index of that basic cell within the first level cell, and the unique index of that first level cell within the second level cell.

7. The collection of devices of claim 6 wherein each device is uniquely identified by an integer derived from the sequence of unique indexes.

8. A method performed by a computer system with a processor and a memory for building a network that connects via communication links a collection of devices, the collection of devices being organized hierarchically into levels, the method comprising:
   building by the computer system basic cells by organizing devices into a plurality of basic cells, each basic cell having a number of devices to be connected via a communication mechanism, the number of devices being the same for each basic cell;
   building by the computer system a first level cell of a first level by organizing basic cells into the first level cell of the first level, a number of basic cells of the first level cell being one more than the number of devices in a basic cell, each pair of basic cells of the first level cell to be directly connected to each other via only one first level link, each first level link to directly connect a device of one basic cell of a pair to a device of the other basic cell of the pair such that no device is to be connected to more than one first level link; and
   building by the computer system a second level cell of a second level by organizing a plurality of first level cells into the second level cell of the second level, a number of first level cells of the second level cell being one more than the number of devices within each first level cell, each pair of first level cells of the second level cell to be directly connected to each other via only one second level link, each second level link to directly connect a device of one first level cell of a pair to a device of the other first level cell of the pair such that no device is to be connected to more than one second level link.

9. The method of claim 8 further comprising:
building by the computer system a third level cell of a third level by organizing a plurality of second level cells into the third level cell of the third level, a number of second level cells of the third level cell being one more than the number of devices within each second level cell, each pair of second level cells of the third level cell being directly connected to each other via only one third level link, each third level link directly connecting a device of one second level cell of a pair to a device of the other second level cell of the pair such that no device is connected to more than one third level link.

10. The method of claim 8 wherein the number of devices in the basic cell is greater than two.

11. The method of claim 8 wherein the devices are servers of a data center.

12. The method of claim 8 wherein each first level cell is provided with a unique index within the second level cell, each basic cell within each first level cell is provided with a unique index within that first level cell, and each device within each basic cell is provided with a unique index within that basic cell such that each device of the network is uniquely identified by a sequence of unique indexes that includes the unique index of the device within its basic cell, the unique index of that basic cell within the first level cell, and the unique index of that first level cell within the second level cell.

13. The method of claim 12 wherein each device is uniquely identified by an integer derived from the sequence of unique indexes.

14. The method of claim 8 wherein the devices of a basic cell re connected via a switching device.

* * * * *